US008816629B2

(12) United States Patent
Sera

(10) Patent No.: US 8,816,629 B2
(45) Date of Patent: Aug. 26, 2014

(54) VIBRATION CONTROL ROBOT SYSTEM

(71) Applicant: Fanuc Corporation, Yamanashi (JP)

(72) Inventor: Takehisa Sera, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/936,884

(22) Filed: Jul. 8, 2013

(65) Prior Publication Data

US 2014/0009100 A1  Jan. 9, 2014

(30) Foreign Application Priority Data

Jul. 9, 2012 (JP) .................... 2012-153502

(51) Int. Cl.
*G05B 5/01* (2006.01)
(52) U.S. Cl.
CPC ....................... *G05B 5/01* (2013.01)
USPC ........... 318/611; 318/623; 318/629; 318/448; 318/568.16
(58) Field of Classification Search
CPC ............ B64C 2027/003; B64C 27/001; B64C 2027/005; G11B 33/08; F16F 15/00; G01R 31/2891; G03G 2215/0154; G03F 7/709
USPC ...................... 318/623, 629, 611, 448, 568.16
See application file for complete search history.

(56) References Cited

U.S. PATENT DOCUMENTS

2005/0187669 A1* 8/2005 Kwak et al. ....................... 701/1

FOREIGN PATENT DOCUMENTS

JP 63-201705 A 8/1988
JP 10100085 A 4/1998

OTHER PUBLICATIONS

Office Action issued for corresponding Japan Patent Application JP 2012-153502 mailed Sep. 17, 2013.

* cited by examiner

*Primary Examiner* — Bentsu Ro
*Assistant Examiner* — Iftekhar Mustafa
(74) *Attorney, Agent, or Firm* — Lowe Hauptman & Ham, LLP

(57) ABSTRACT

A vibration control robot system of the present invention includes: a robot controller (101) transmitting an operation command value and receiving an output value of a pulse encoder of the servo motor, wherein the robot controller includes a controller-side communication unit (5) which transmits the operation command value and the output value of the pulse encoder to a robot vibration controller; and the robot vibration controller (11) including: an acceleration sensor interface (15); a corrected operation command value calculation unit (13) which calculates a corrected operation command value obtained so as to suppress vibration of the robot; and a vibration-controller-side communication unit (12) which transmits the corrected operation command value to the robot controller (101), wherein the robot vibration controller (11) is arranged independently of the robot controller (101).

6 Claims, 21 Drawing Sheets

FIG. 4

```
<EXAMPLE OF OPERATION PROGRAM>

1 : LP [1] 2000 mm/sec FINE    · · · · · POINT A

2 : LVC START       · · · · · · · · · · · LEARNING START POINT

3 : LP [2] 2000 mm/sec SPOT

4 : LP [3] 2000 mm/sec SPOT

5 : LVC END         · · · · · · · · · · · LEARNING END POINT

6 : LP [4] 2000 mm/sec SPOT    · · · · · POINT B
```

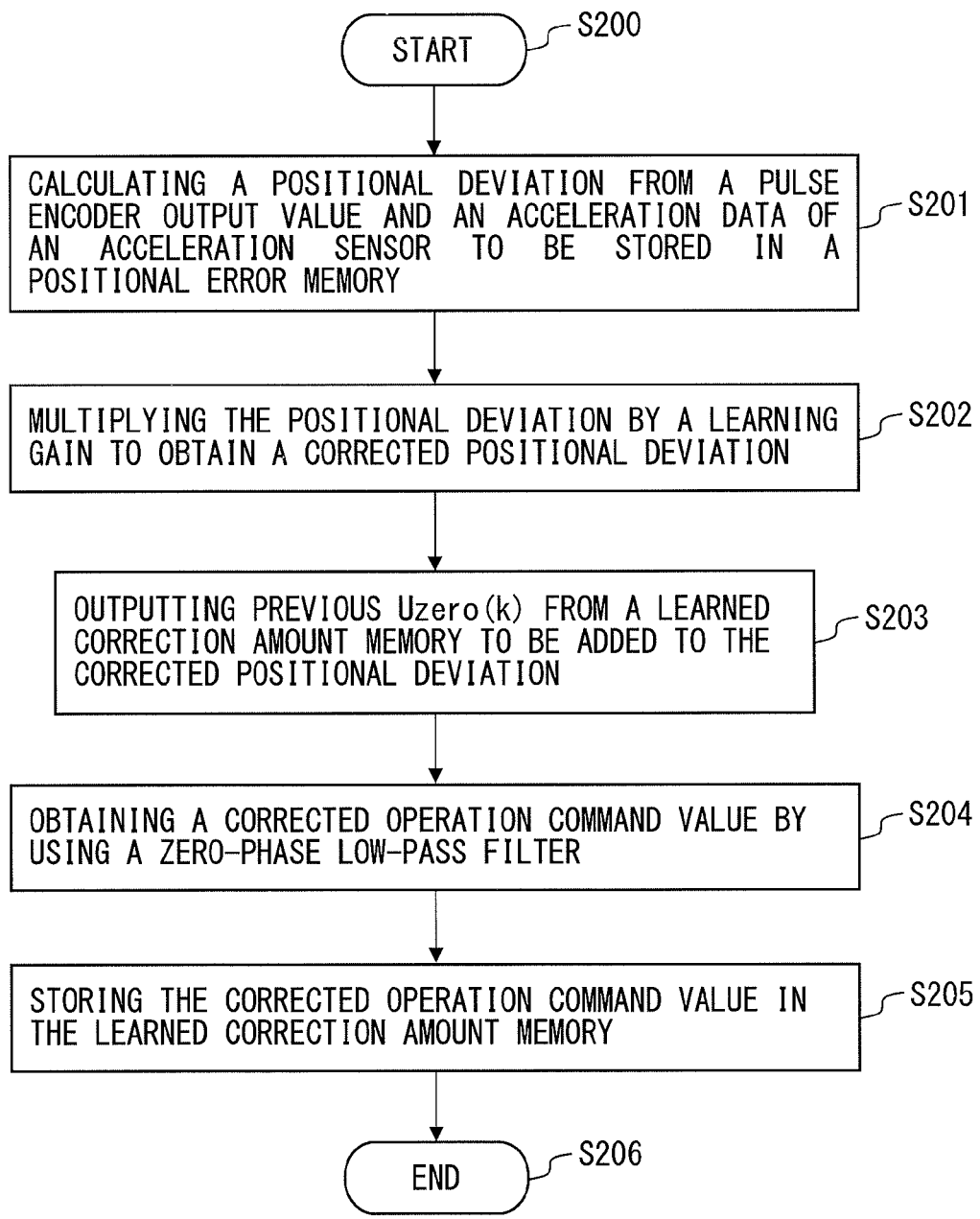

VIBRATION CONTROL ROBOT SYSTEM

REALTED APPLICATIONS

The present application is based on, and claims priority from, Japanese Application Number 2012-153502, filed Jul. 9, 2012, the disclosure of which is hereby incorporated by reference herein in its entirety.

FIELD OF THE INVENTION

The present invention relates to a vibration control robot system, and particularly to a vibration control robot system in which a robot vibration controller is arranged independently of a robot controller.

BACKGROUND OF THE INVENTION

As one method of suppressing vibration of a robot arm, a vibration control method is known which includes: attaching an acceleration sensor to an arm tip; generating a compensation signal by using an acceleration signal to be generated by vibration and some robot parameters; and suppressing vibration by feeding back the compensation signal to be obtained to a torque command of each spindle motor (see, for example, JP-A-10-100085).

A block diagram of a vibration suppression controller utilizing a conventional vibration control method is illustrated in FIG. 1. A robot includes an arm 110 having a plurality of arm link units connected to each other via a joint unit, and an acceleration sensor 105 is arranged in the vicinity of the tip of the arm 110. A controller 108 which controls the movement of the arm 110 has a servo driver 114 which drives each joint unit of the arm 110 based on a velocity command value. An acceleration amount detected by the acceleration sensor 105 is input to a calculation unit 112. The calculation unit 112 calculates, based on the acceleration amount, a compensation component for each joint unit which compensates a velocity command value for each joint unit to the servo driver 114 so as to suppress vibration generated at the tip of the arm 110, and subtracts a value obtained by multiplying the calculated compensation component for each joint unit by a gain from the corresponding velocity command value.

When vibration control is performed, an acceleration sensor attached at the arm tip, an acceleration sensor interface which receives a signal from the acceleration sensor, and software for vibration control in which control for suppressing vibration is performed by feeding back a compensation signal to be obtained from a signal received via the acceleration sensor interface to a torque command of each spindle motor are required.

In a manufacturing line of a factory in which a plurality of robots are used, when a vibration control robot system is to be constructed, memory needs to be added to each robot controller; a board for the acceleration sensor interface is needed; and software for vibration control is required. However, it is difficult to incorporate these elements in existing robot controllers afterwards, resulting in cost increases.

SUMMARY OF THE INVENTION

A vibration control robot system according to Examples of the present invention includes: a robot controller transmitting an operation command value to a servo motor which drives a robot and receiving an output value of a pulse encoder of the servo motor moving based on the operation command value, wherein the robot controller includes a controller-side communication unit which transmits the operation command value and the output value of the pulse encoder to a robot vibration controller; and the robot vibration controller including: an acceleration sensor interface which receives data of an acceleration sensor included in a control target portion of the robot; a corrected operation command value calculation unit which calculates, based on the output value of the pulse encoder and the data of the acceleration sensor, a corrected operation command value obtained by correcting the operation command value so as to suppress vibration of the robot; and a vibration-controller-side communication unit which transmits the corrected operation command value to the robot controller, and is characterized in that the robot vibration controller is arranged independently of the robot controller.

When a vibration control robot system according to Examples of the present invention is used, by arranging a robot vibration controller independently of a robot controller, vibration control of a plurality of robots can be performed by utilizing one robot vibration controller. Therefore, an acceleration sensor interface does not need to be arranged in each robot controller, or software for vibration control does not need to be installed in each robot controller. A system composed of a plurality of robots thus can be constructed into a robot system which can perform vibration control without increasing costs.

When a vibration control robot system according to another Example of the present invention is used, by performing communication between a robot controller and a robot vibration controller or communication between the robot vibration controller and an acceleration sensor of the robot wirelessly, data can be easily transmitted and received between one robot vibration controller, and a plurality of robots and acceleration sensors of the robots.

DESCRIPTION OF THE DRAWINGS

These and other features and advantages of the present invention will be better understood from reference to the following detailed description, taken together with the drawings wherein:

FIG. 4 is an operation program of a robot of a vibration control robot system according to Example 1 of the present invention.

FIG. 6 is a flowchart illustrating an operation procedure of a corrected operation command value calculation unit of a vibration control robot system according to Example 1 of the present invention.

DETAILED DESCRIPTION OF THE PREFERRED EMBODIMENT

With reference to the Drawings, a vibration control robot system of the present invention will be described. It should be noted that the technical scope of the present invention is not limited to the embodiments thereof, and extends to the inventions described in the Claims and equivalents thereof.

(First Embodiment)

Figure 1:
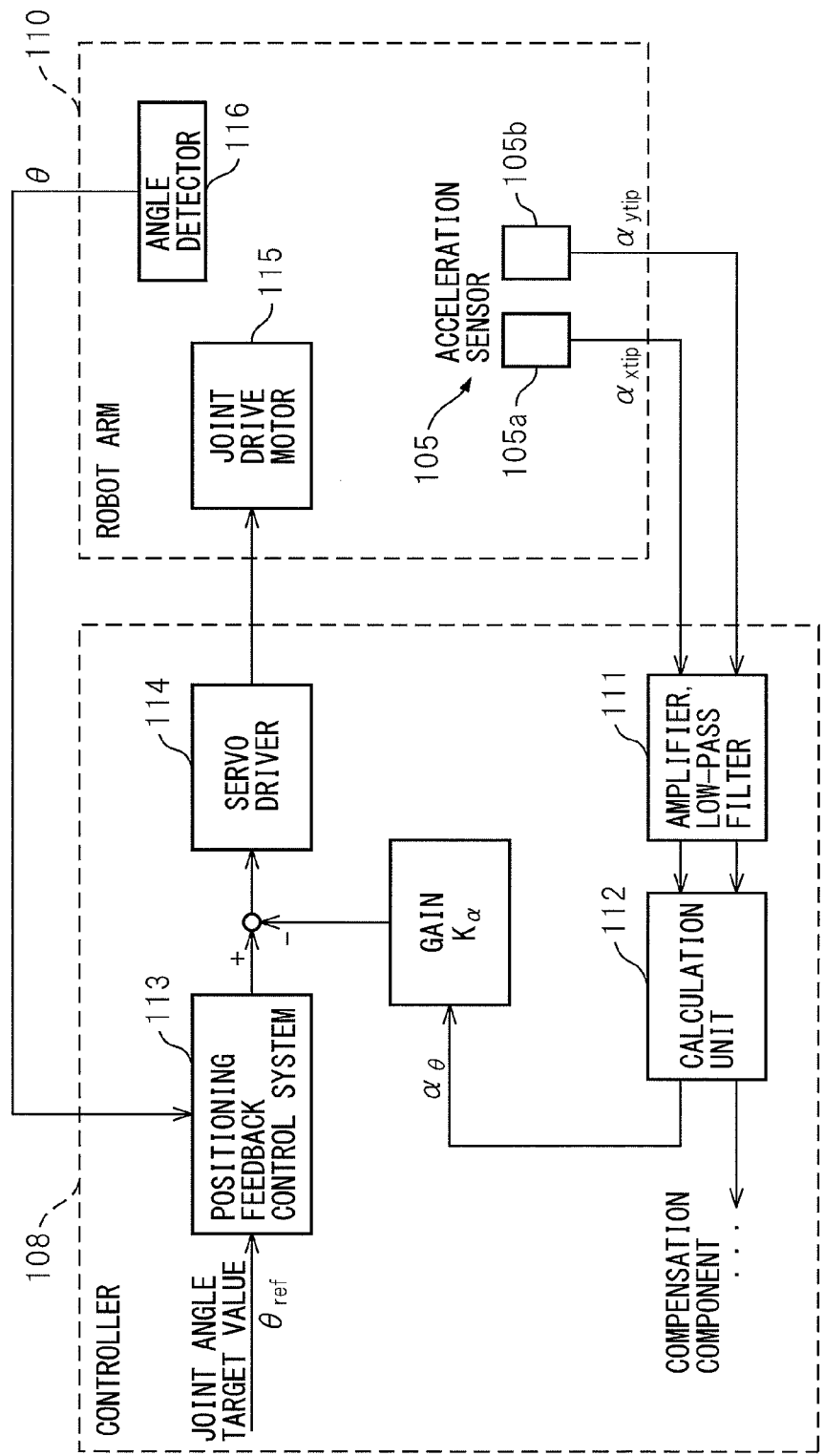
FIG. 1 is a block diagram illustrating the constitution of a conventional robot controller.
Figure 2:
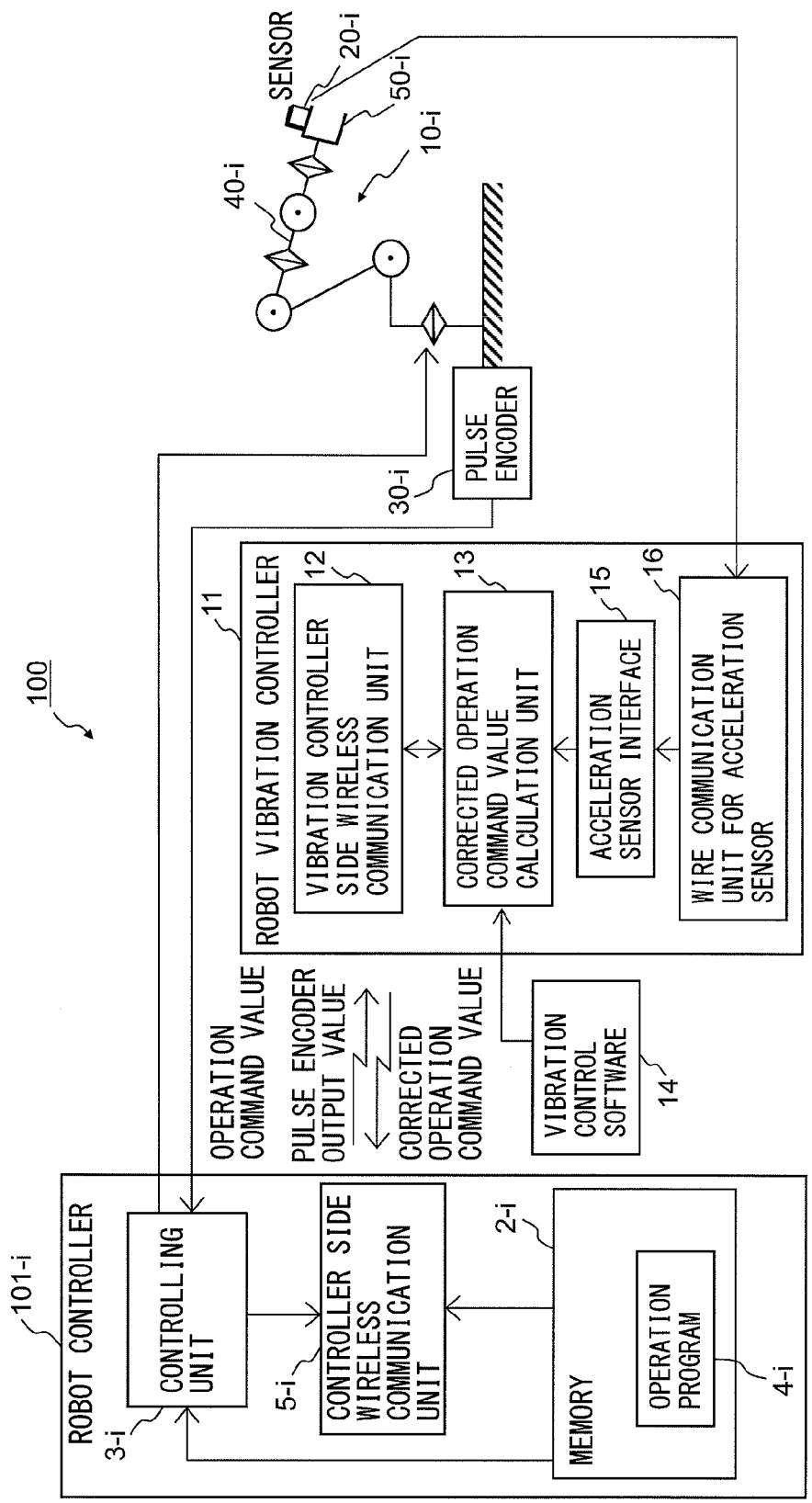
FIG. 2 is a block diagram illustrating the constitution of a vibration control robot system according to Example 1 of the present invention.

First, a vibration control robot system according to Example 1 of the present invention will be described by way of the Drawings. FIG. 2 is a block diagram of a vibration control robot system according to Example 1 of the present invention. A vibration control robot system 100 according to Example 1 includes a robot controller 101-i which controls a robot 10-i and a robot vibration controller 11, and a robot vibration controller 11 is characterized by being arranged independently of the robot controller 101-i.

As mentioned below, the one robot vibration controller 11 according to Example 1 of the present invention can perform vibration control of a plurality of (for example, n) robot controllers 101-1 to 101-n and robots 10-1 to 10-n. Therefore, the above index "i" represents any integer from 1 to n.

The robot 10-i performs a predetermined operation such as spot welding by allowing an arm 40-i to move by driving a servo motor (not illustrated) based on an operation command value from the robot controller 101-i and moving an arm distal portion 50-i which is a control target portion to a desired position. The robot 10-i includes an acceleration sensor 20-i for detecting acceleration of the arm distal portion 50-i. By using acceleration data detected by the acceleration sensor 50-i, the position or vibration of the arm distal portion can be calculated.

The robot controller 101-i includes a controller-side wireless communication unit 5-i which is a controller-side communication unit which transmits an operation command value to a servo motor (not illustrated) for driving the robot 10-i, which receives an output value of a pulse encoder 30-i of a servo motor (not illustrated) moving based on the operation command value and which transmits an operation command value and an output value of the pulse encoder to the robot vibration controller 11.

Further, the robot controller 101-i includes a memory 2-i storing an operation program 4-i for allowing the robot 10-i to move and a controlling unit 3-i for allowing the robot 10-i to move according to the operation program 4-i. The controlling unit 3-i transmits an operation command value for allowing the robot 10-i to move to a servo motor (not illustrated) of the robot 10-i, and obtains an output value of a pulse encoder from a pulse encoder 30-i installed on a servo motor of robot 10-i moved according to the operation command value. The controller-side wireless communication unit 5-i obtains an operation command value for allowing the robot 10-i to move from the memory 2-i and at the same time, obtains an output value of the pulse encoder from the controlling unit 3-i, and transmits the obtained operation command value and an output value of the pulse encoder to the robot vibration controller 11.

The robot vibration controller 11 includes: an acceleration sensor interface 15 which receives data of an acceleration sensor 20-i included in a control target portion of the robot 10-i; a corrected operation command value calculation unit 13 which calculates, based on the output value of the pulse encoder 30-i and the data of the acceleration sensor 20-i, a corrected operation command value obtained by correcting the operation command value so as to suppress vibration of the robot 10-i; and a vibration-controller-side wireless communication unit 12 which is a vibration-controller-side communication unit which transmits the corrected operation command value to the robot controller 101-i. The corrected operation command value calculation unit 13 calculates the corrected operation command value by using vibration control software 14 which is installed externally.

The robot vibration controller 11 according to Example 1 is arranged independently of the robot controller 101-i, and communication between the controller-side wireless communication unit 5-i and the vibration-controller-side wireless communication unit 12 is performed wirelessly. Since the robot vibration controller 11 is arranged independently of the robot controller 101-i, the robot vibration controller 11 performs vibration control of robot 10-k (not illustrated) by performing communication wirelessly with another robot controller 101-k (i≠k) (not illustrated) different from the robot controller 101-i.

Accordingly, although FIG. 2 illustrates one robot controller and one robot, a plurality of robot controllers and a plurality of robots may be arranged. In other words, for n sets of (n>1) robot controllers 101-1 to 101-n and robots 10-1 to 10-n, only one robot vibration controller 11 may be arranged for performing vibration control of the robots. FIG. 2 only illustrates the i-th robot 10-i and robot controller 101-i as representatives of n sets of robots 10-1 to 10-n and n sets of robot controllers 101-1 to 101-n which control these robots.

By adopting such a constitution as in Example 1, only one corrected operation command value calculation unit 13 which is needed for performing vibration control of a plurality of robots, one package of vibration control software 14 and one acceleration sensor interface 15 are needed, and costs can be reduced compared to a conventional vibration control robot system in which a plurality of corrected operation command value calculation units, a plurality of vibration control software packages and a plurality of acceleration sensor interfaces are arranged in the robot controller for performing vibration control of a plurality of robots.

Figure 3:
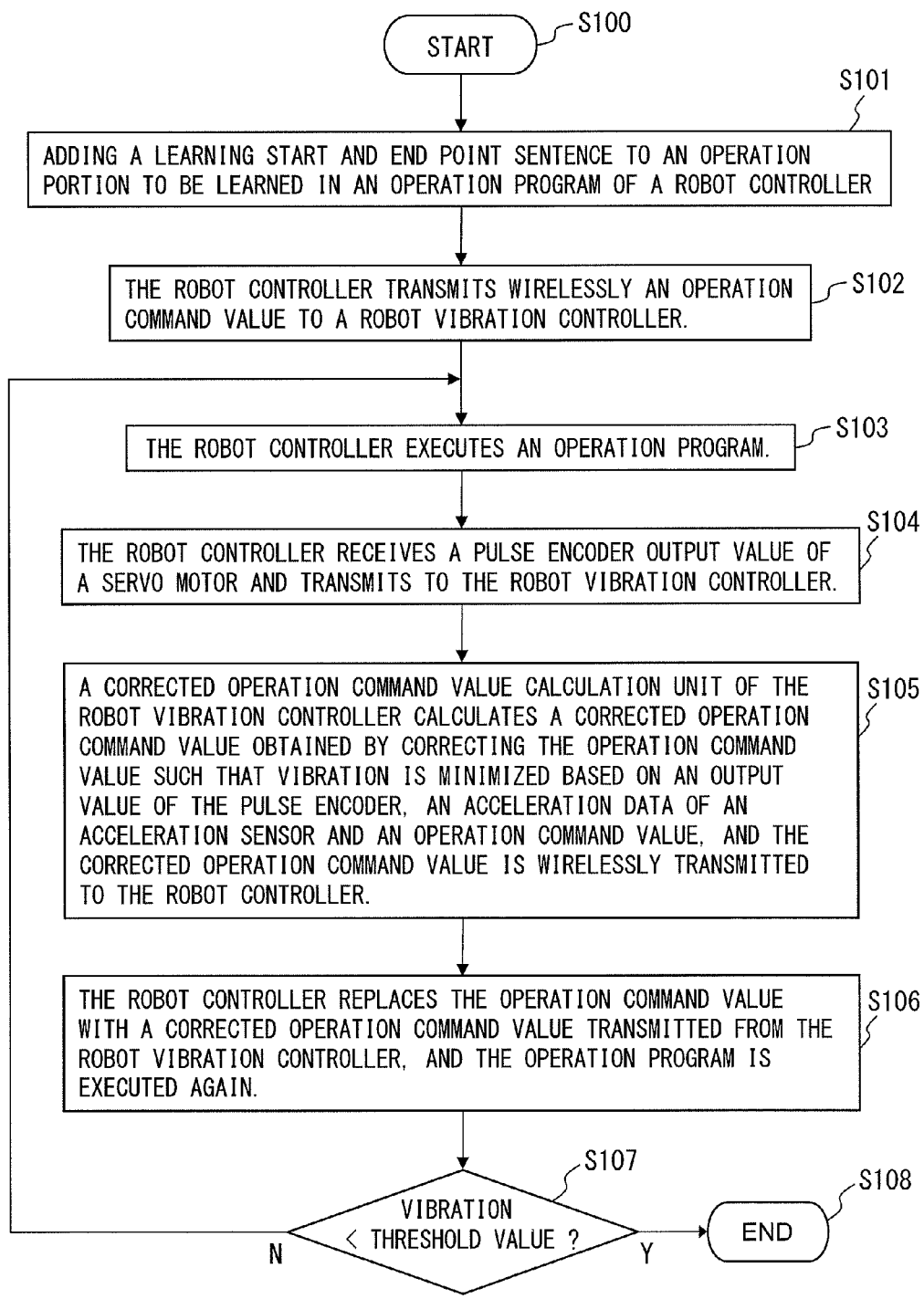
FIG. 3 is a flowchart illustrating an operation procedure of a vibration control robot system according to Example 1 of the present invention.

Next, an operating method of the vibration control robot system according to Example 1 of the present invention will be described. FIG. 3 is a flowchart for describing the operation procedure of the vibration control robot system according to Example 1.

First, in step S101, an operation program for driving robot 10-i is read out from a memory 3-i of the robot controller 101-i, and a learning start point sentence and a learning end point sentence are added to an operating portion to be learned by the robot 10-i in the operation program.

For a concrete description of the operation program, one example thereof is illustrated in FIG. 4. The operation program illustrated in FIG. 4 allows the arm distal portion 50-i which is a control target portion of the robot 10-i to move from a desired point A to a desired point B. A statement "LVC START" for designating a learning start point and a statement "LVC END" for designating a learning end point are added to the operating portion to be learned by the robot in the operation program.

Next, in step S102, the robot controller 101-i transmits wirelessly an operation command value to the robot vibration controller 11. Specifically, the operation command value is transmitted from the memory 2-i of the robot controller 101-i to the controller-side wireless communication unit 5-i, and the operation command value is wirelessly transmitted from the controller-side wireless communication unit 5-i to the vibration-controller-side wireless communication unit 12 of the robot vibration controller 11.

Next, in step S103, the robot controller 101-i executes an operation program.

By executing such an operation program, a learning operation of the robot 10-i is performed by the controlling unit 3-i of the robot controller 101-i, and the learning is repeated until vibration of the arm distal portion 50-i is equal to or below a predetermined value based on acceleration data detected by the acceleration sensor 20-i arranged at the arm distal portion 50-i of the robot 10-i during the learning operation. In the present Example, in order to minimize vibration of the arm distal portion 50-i so as to be equal to or below a predetermined value, vibration control for correcting the operation command value is performed by the robot vibration controller 11.

Next, in step S104, the robot controller 101-i receives and stores an output value of the pulse encoder 30-i of the servo motor (not illustrated) of the robot 10-i, and the output value is wirelessly transmitted to the robot vibration controller 11. Specifically, after the controlling unit 3-i of the robot controller 101-i receives the output value of the pulse encoder 30-i, the output value is transmitted to the controller-side wireless communication unit 5-i, and the output value of the pulse encoder 30-i is wirelessly transmitted from the controller-side wireless communication unit 5-i to the vibration-controller-side wireless communication unit 12 of the robot vibration controller 11.

Next, in step S105, the robot vibration controller 11 calculates a corrected operation command value correcting the operation command value such that vibration of the arm distal portion 50-i is minimized based on an output value of the pulse encoder 30-i, acceleration data which is a detected result of the acceleration sensor 20-i and an operation command value, and the corrected operation command value is wirelessly transmitted to the robot controller 101-i.

Figure 5:
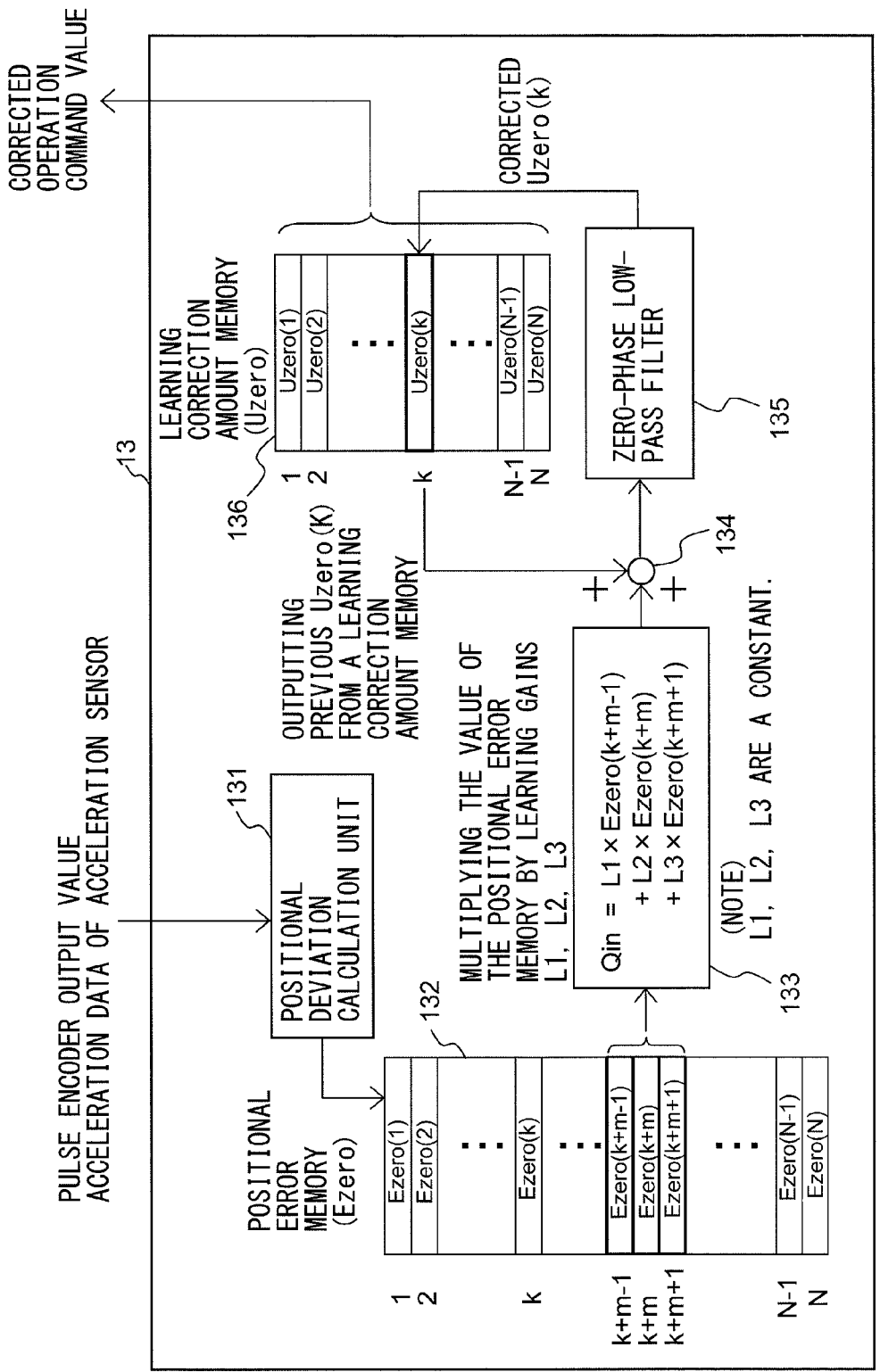
FIG. 5 is a block diagram illustrating the constitution of a corrected operation command value calculation unit of a vibration control robot system according to Example 1 of the present invention.

The calculation of the corrected operation command value is performed in the corrected operation command value calculation unit 13 in the robot vibration controller 11, and will be described by way of the Drawings. FIG. 5 is a block diagram illustrating the constitution of the corrected operation command value calculation unit 13 in the robot vibration controller 11 according to Example 1. The corrected operation command value calculation unit 13 includes a positional deviation calculation unit 131, a positional error memory 132, a learning gain multiplication unit 133, an adder 134, a zero-phase low-pass filter 135 and a learning correction amount memory 136.

Next, a calculating method of a corrected operation command value will be described by way of FIG. 6, which is a flowchart illustrating a calculating procedure for a corrected operation command value in the corrected operation command value calculation unit 13. The calculation of the corrected operation command value in the corrected operation command value calculation unit 13 is performed by executing the vibration control software 14 installed from outside the robot vibration controller 11.

First, in step S201, the positional deviation calculation unit 131 calculates a positional deviation from an output value of the pulse encoder 30-i and acceleration data which is an output value of the acceleration sensor 20-i, and the positional deviation is stored in the positional error memory 132. Specifically, the acceleration data is converted by a position converter (not illustrated) into position data, and positional deviations Ezero(1) to Ezero(N) are calculated from the converted position data and an output value of the pulse encoder. Here, N represents the number of steps when the learning operation is executed in N steps.

Next, in step S202, the learning gain multiplication unit 133 multiplies the positional deviation by a learning gain to obtain a corrected positional deviation. Specifically, by using the formula below, a corrected positional deviation Qin is calculated with respect to the k-th positional deviation Ezero(k).

$$Qin = L1 \times Ezero(k+m-1) + L2 \times Ezero(k+m) + L3 \times Ezero(k+m+1)$$

Here, m is a predetermined integer, and L1, L2 and L3 are learning gains, each of which is a constant.

Next, in step S203, a Uzero(k) which is a learning correction amount in the previous trial is output from the learning correction amount memory 136, and is added to a corrected positional deviation Qin by using the adder 134.

Next, in step S204, a corrected operation command value is calculated by using the zero-phase low-pass filter 135.

Next, in step S205, a corrected operation command value Uzero(k) is replaced with an operation command value Uzero(k) which is not corrected, to be stored in the learning correction amount memory 136.

By performing the above steps S201 to S205 for k=1 to N, a learning correction amount is calculated, and a corrected operation command value is calculated from an operation command value and a learning correction amount. The calculated corrected operation command value is transmitted from the corrected operation command value calculation unit 13 to the vibration-controller-side wireless communication unit 12, and transmitted from the vibration-controller-side wireless communication unit 12 to the controller-side wireless communication unit 5-i.

Next, as illustrated in FIG. 3, in step S106, the robot controller 101-i replaces the operation command value with a corrected operation command value transmitted from the robot vibration controller 11, and an operation program is executed again.

Next, in step S107, the robot vibration controller 11 calculates the magnitude of vibration based on acceleration data obtained from the acceleration sensor 20-i so as to determine the magnitude relationship between the magnitude of vibration and a predetermined threshold value.

When the vibration is equal to or below a predetermined threshold value, the robot vibration controller 11 terminates the vibration control, and the robot controller 101-i drives the robot 10-i based on the corrected operation command value calculated the last time. On the other hand, when the vibration is greater than a predetermined threshold value, going back to step S103, the robot controller 101-i drives the robot 10-i again, repeating steps S104 to S106 to calculate a corrected operation command value until the vibration becomes equal to or below a predetermined threshold value.

As mentioned above, by adopting the vibration control robot system according to Example 1 of the present invention, there is no need to install vibration control software on each of a plurality of robot controllers, since the robot vibration controller is arranged independently of the robot controller. By performing vibration control which calculates a corrected operation command value of a robot including an acceleration sensor by a robot vibration controller, and by transmitting a corrected operation command value to a robot controller by utilizing a wireless device, a robot vibration control system can be constructed easily.

In particular, in a factory in which a plurality of robots are used, when all robot are to be subjected to vibration control, conventionally, a vibration controller needs to be arranged for each of the robot controllers, thereby increasing the overall cost of the factory as a whole. However, by adopting the vibration control robot system according to Example 1 of the present invention, since one robot vibration controller can perform vibration control of all robots in the factory, the total cost can be reduced.

Next, an embodiment in which vibration control is performed on a plurality of robots by using the robot vibration controller according to Example 1 of the present invention will be described. Since the robot vibration controller according to Example 1 of the present invention can be arranged independently of a robot controller, individual vibration control of the plurality of robots can also be performed by using one robot vibration controller, and alternatively, simultaneous vibration control of the plurality of robots can also be performed. These two control methods will now be described.

Figure 7A:
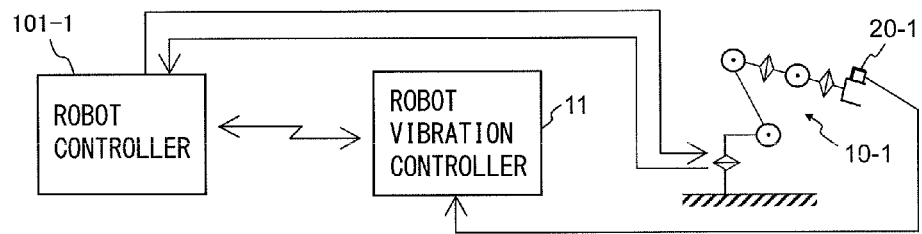
FIGS. 7A-7C are block diagrams illustrating a constitution wherein vibration control of a plurality of robots is individually performed by using a vibration control robot system according to Example 1 of the present invention.
Figure 7B:
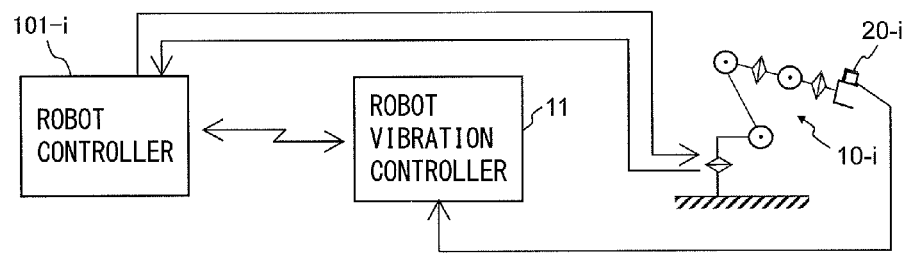
Figure 7C:
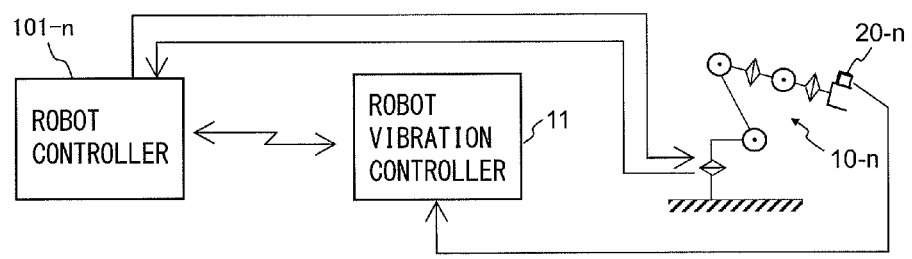

First, a case where individual vibration control of a plurality of (n) robots 10-1 to 10-n is performed by using one robot vibration controller will be described. FIGS. 7A-7C are block diagrams illustrating a constitution wherein individual vibration control of a robot is performed by using a vibration control robot system according to Example 1 of the present invention. First, as illustrated in FIG. 7A, a robot vibration controller 11 is connected to a first robot controller 101-1 and to a robot 10-1, and vibration control is performed. Here, the robot vibration controller 11 and the robot controller 101-1 are wirelessly connected, and the robot vibration controller 11 and an acceleration sensor 20-1 of the robot 10-1 are connected with wires. The method of vibration control is the same as mentioned above.

Next, as illustrated in FIG. 7B, for performing vibration control of other robots 10-i (i=2 to n−1), the robot vibration controller 11 is connected to a robot controller 101-i wirelessly, and the robot vibration controller 11 is connected to an acceleration sensor 20-i of a robot 10-i with wires, and thereafter, vibration control of the robot 10-i is performed.

Lastly, as illustrated in FIG. 7C, for performing vibration control of the last robot 10-n, the robot vibration controller 11 and the robot controller 101-n are connected wirelessly, and the robot vibration controller 11 and the acceleration sensor 20-n of the robot 10-n are connected with wires, and thereafter, vibration control of the robot 10-n is performed.

By adopting such a constitution as above, vibration control of a plurality of robots can be individually performed by using one robot vibration controller.

Figure 8:
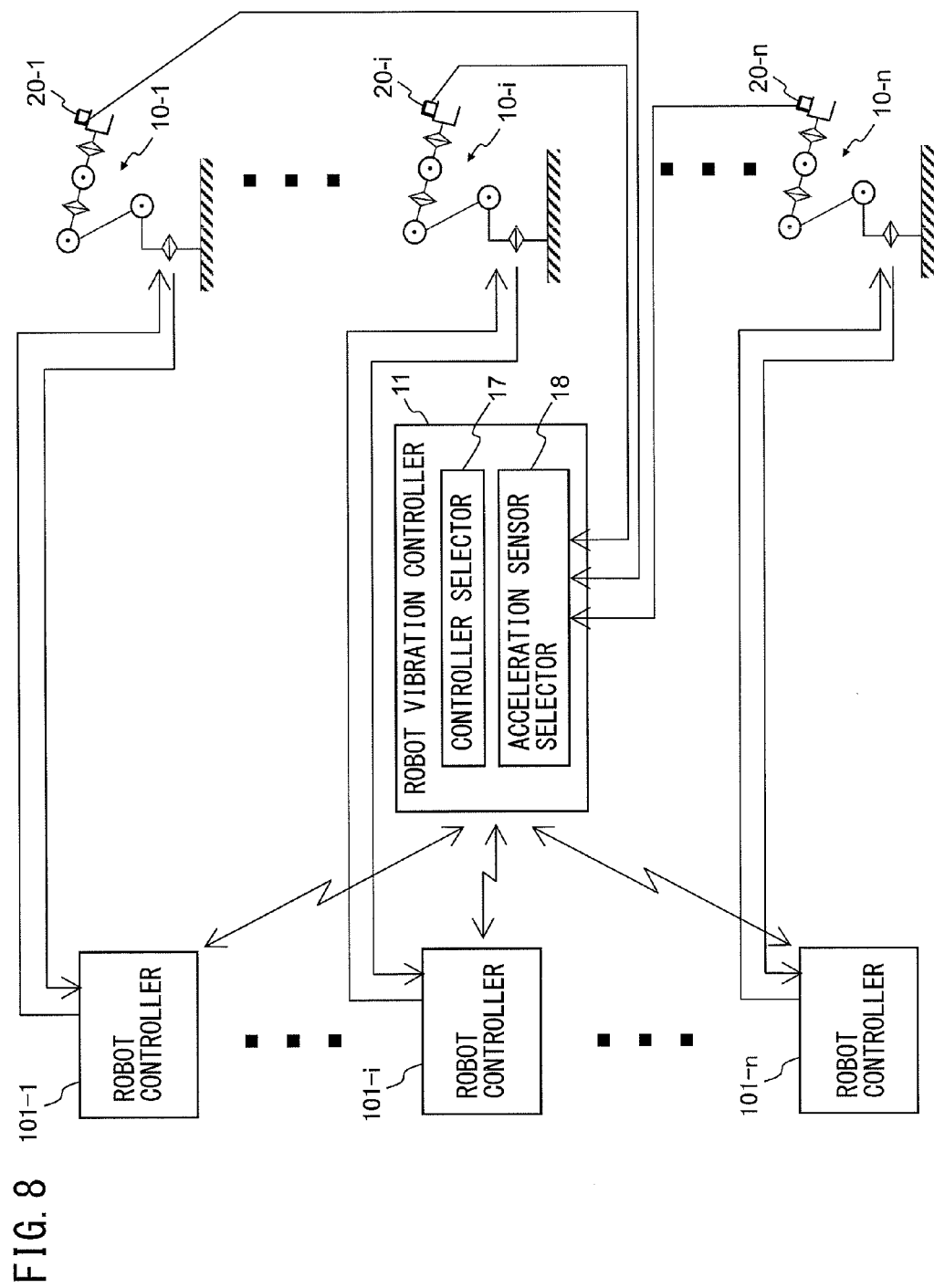
FIG. 8 is a block diagram illustrating a constitution wherein vibration control of a plurality of robots is simultaneously performed by using a vibration control robot system according to Example 1 of the present invention.

Next, a case where simultaneous vibration control of a plurality of (n) robots 10-1 to 10-n by using one robot vibration controller will be described. FIG. 8 is a block diagram illustrating a constitution wherein simultaneous vibration control of a robot is performed by using the vibration control robot system according to Example 1 of the present invention.

As illustrated in FIG. 8, a plurality of robot controllers 101-1 to 101-n are connected to the robot vibration controller 11 wirelessly. On the robot vibration controller 11, a controller selector 17 is arranged for communicating with a specific one of robot controllers 101-1 to 101-n. Acceleration sensors 20-1 to 20-n of a plurality of robots 10-1 to 10-n are connected to the robot vibration controller 11 with wires. On the robot vibration controller 11, an acceleration sensor selector 18 is arranged for communicating with a specific one of acceleration sensors 20-1 to 20-n.

Figure 9:
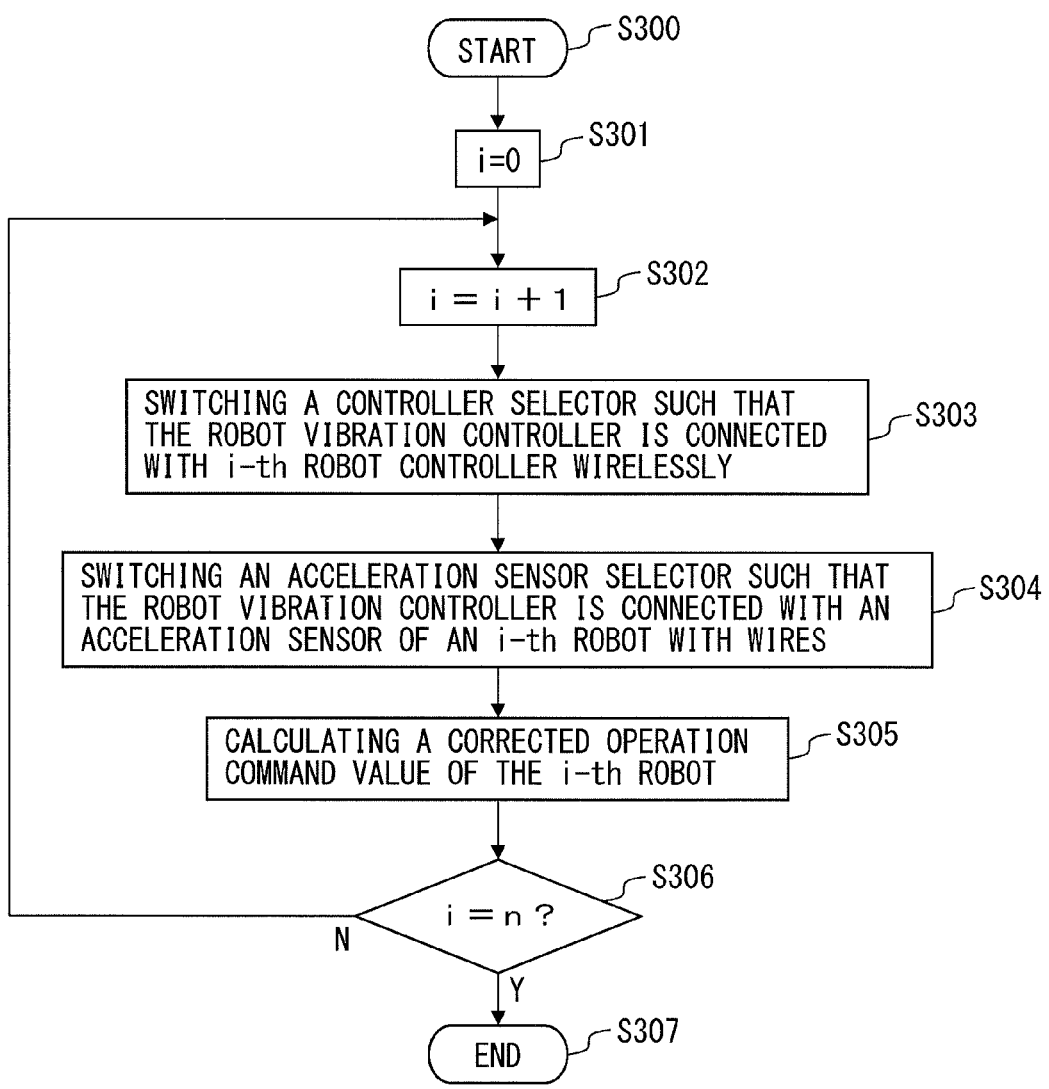
FIG. 9 is a flowchart illustrating a procedure wherein corrected operation command values of a plurality of robots are calculated by using a vibration control robot system according to Example 1 of the present invention.

Next, a procedure wherein vibration control of a plurality of robots is simultaneously performed by using a robot vibration controller according to Example 1 of the present invention will be described. FIG. 9 is a flowchart illustrating a procedure wherein corrected operation command values of a plurality of robots are calculated by using the vibration control robot system according to Example 1 of the present invention.

First, in step S301, an initial value of the number i for specifying a robot is set to 0. Next, in step S302, i is incremented by 1.

Next, in step S303, a controller selector 17 is switched such that the robot vibration controller 11 is connected to the i-th robot controller 101-i wirelessly. For example, when i=1, communication between the robot vibration controller 11 and the robot controller 101-1 can be performed.

Next, in step S304, the acceleration sensor selector 18 is switched such that the robot vibration controller 11 is connected to an acceleration sensor of the i-th robot with wires. For example, when i=1, communication between the robot vibration controller 11 and the acceleration sensor 20-1 of the robot 10-1 can be performed.

Next, in step S305, a corrected operation command value of the i-th robot is calculated. The procedure for calculating a corrected operation command value is the same as mentioned above.

The corrected operation command value is calculated and vibration control is completed, and then, by judging whether i=n or not in step S306, whether vibration control of all n sets of robots which are targets of vibration control is completed is judged. When i=n, vibration control of all robots is judged to be completed, and the vibration control operation is terminated. On the other hand, when 1<n, returning to step S302, i is incremented by 1 to execute vibration control of a robot which is the next target of vibration control.

By adopting such a constitution as above, vibration control of a plurality of robots can be simultaneously performed by using one robot vibration controller.

By adopting the vibration control robot system according to Example 1 of the present invention, since the robot controller and the robot vibration controller are wirelessly connected, data can be easily transmitted and received. Further, since the robot vibration controller and the acceleration sensor of the robot are connected with wires, this can provide an advantage, for example, in a case where it is difficult to arrange a transmitter for performing wireless communication on an arm distal portion or where it is difficult to transmit data wirelessly due to noise or the like.

(Second Embodiment)

Figure 10:
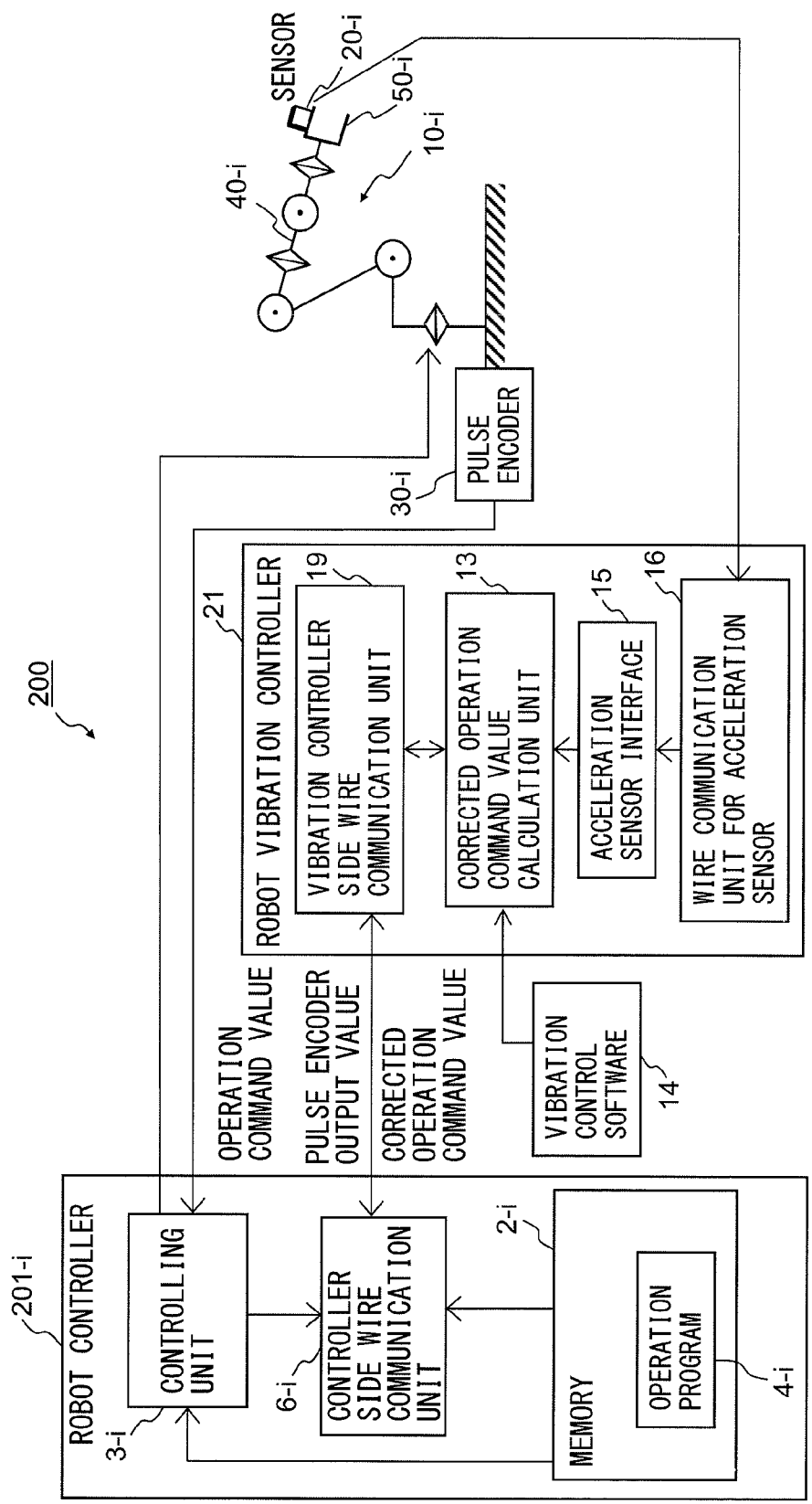
FIG. 10 is a block diagram illustrating the constitution of a vibration control robot system according to Example 2 of the present invention.

Next, a vibration control robot system according to Example 2 of the present invention will be described by way of the Drawings. FIG. 10 is a block diagram of the vibration control robot system according to Example 2 of the present invention. A vibration control robot system 200 according to Example 2 includes a robot controller 201-i which controls a robot 10-i and a robot vibration controller 21, and a robot vibration controller 21 is characterized by being arranged independently of the robot controller 201-i and in that communication between a controller-side wire communication unit 6-i which is a controller-side communication unit of the robot vibration controller 21 and a vibration-controller-side wire communication unit 19 which is a vibration-controller-side communication unit is performed with wires.

A difference between the vibration control robot system 200 according to Example 2 and the vibration control robot system 100 according to Example 1 is that communication between a controller-side wire communication unit 6-i which is a controller-side communication unit of the robot vibration controller 21 and the vibration-controller-side wire communication unit 19 which is a vibration-controller-side communication unit is performed with wires. Since the procedure in which vibration control of the robot 10-i is performed by calculating a corrected operation command value is the same as in Example 1, a detailed description thereof is omitted.

Next, an embodiment wherein vibration control is performed on a plurality of robots by using the robot vibration controller according to Example 2 of the present invention will be described. Since the robot vibration controller of the present invention can be arranged independently of a robot controller, individual vibration control of the plurality of robots can also be performed by using one robot vibration controller, and alternatively, simultaneous vibration control of the plurality of robots can also be performed. These two control methods will now be described.

Figure 11A:
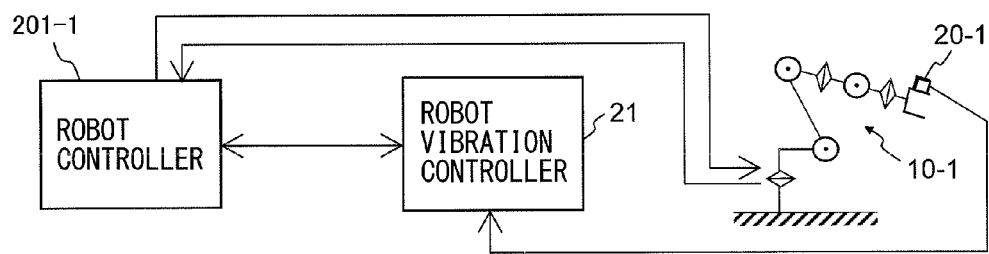
FIGS. 11A-11C are block diagrams illustrating a constitution wherein vibration control of a plurality of robots is individually performed by using a vibration control robot system according to Example 2 of the present invention.
Figure 11B:
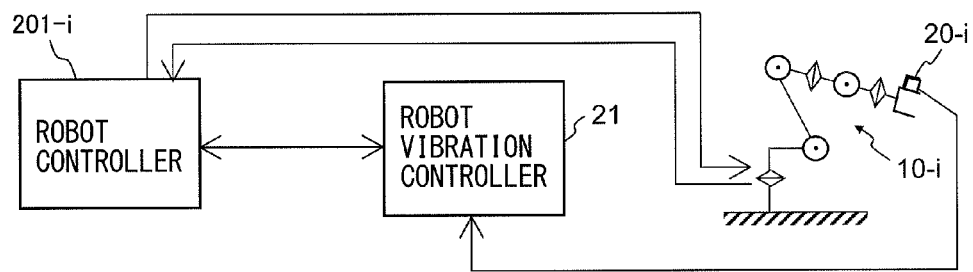
Figure 11C:
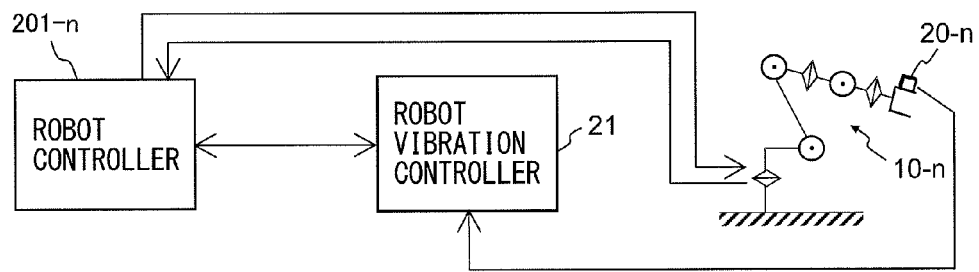

First, a case wherein individual vibration control of a plurality of (n) robots 10-1 to 10-n by using one robot vibration controller will be described. FIGS. 11A-11C are block diagrams illustrating a constitution when individual vibration control of a robot is performed by using vibration control robot system according to Example 2 of the present invention. First, as illustrated in FIG. 11A, a robot vibration controller 21 is connected to a first robot controller 201-1 and to a robot 10-1, and vibration control is performed. Here, the robot vibration controller 21 and the robot controller 201-1 are connected with wires, and the robot vibration controller 21 and an acceleration sensor 20-1 of the robot 10-1 are also connected with wires. The method of vibration control is the same as mentioned above.

Next, as illustrated in FIG. 11B, for performing vibration control of other robots 10-i (i=2 to n−1), the robot vibration controller 21 is connected to a robot controller 201-i with wires, and the robot vibration controller 21 is also connected to an acceleration sensor 20-i of a robot 10-i with wires, and thereafter, vibration control of the robot 10-i is performed.

Lastly, as illustrated in FIG. 11C, for performing vibration control of the last robot 10-n, the robot vibration controller 21 and the robot controller 201-n are connected with wires, and the robot vibration controller 21 and the acceleration sensor 20-n of the robot 10-n are also connected with wires, and thereafter, vibration control of the robot 10-n is performed.

By adopting such a constitution as above, vibration control of a plurality of robots can be individually performed by using one robot vibration controller.

Figure 12:
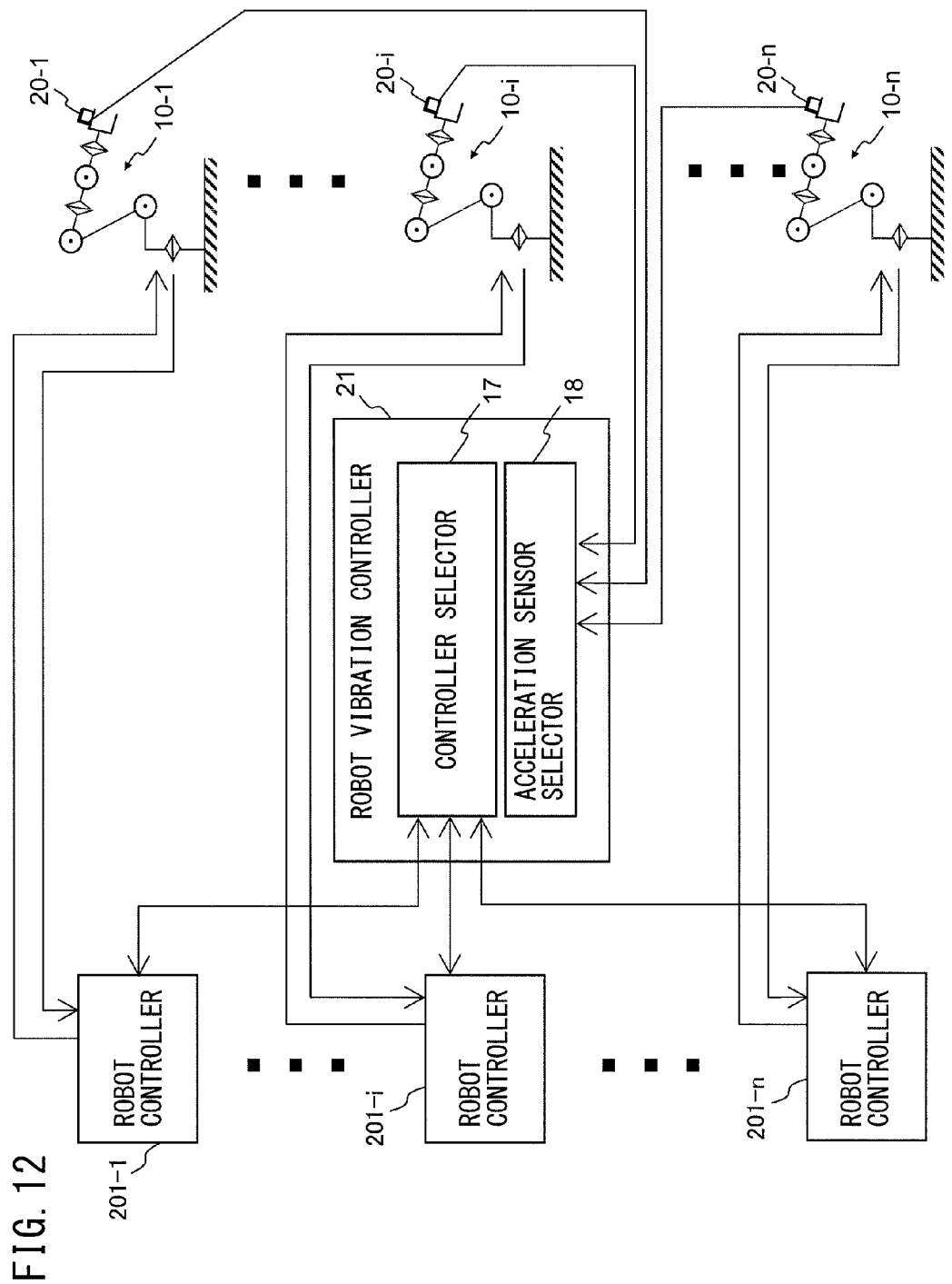
FIG. 12 is a block diagram illustrating a constitution wherein vibration control of a plurality of robots is simultaneously performed by using a vibration control robot system according to Example 2 of the present invention.

Next, a case wherein simultaneous vibration control of a plurality of (n) robots 10-1 to 10-n is performed by using one robot vibration controller will be described. FIG. 12 is a block diagram illustrating a constitution wherein simultaneous vibration control of a robot is performed by using the vibration control robot system according to Example 2 of the present invention.

As illustrated in FIG. 12, a plurality of robot controllers 201-1 to 201-n are connected to the robot vibration controller 21 with wire. On the robot vibration controller 21, a controller selector 17 is arranged for communicating with a specific one of robot controllers 201-1 to 201-n. Acceleration sensors 20-1 to 20-n of a plurality of robots 10-1 to 10-n are connected to the robot vibration controller 21 with wires. On the robot vibration controller 21, an acceleration sensor selector 18 is arranged for communicating with a specific one of acceleration sensors 20-1 to 20-n.

Figure 13:
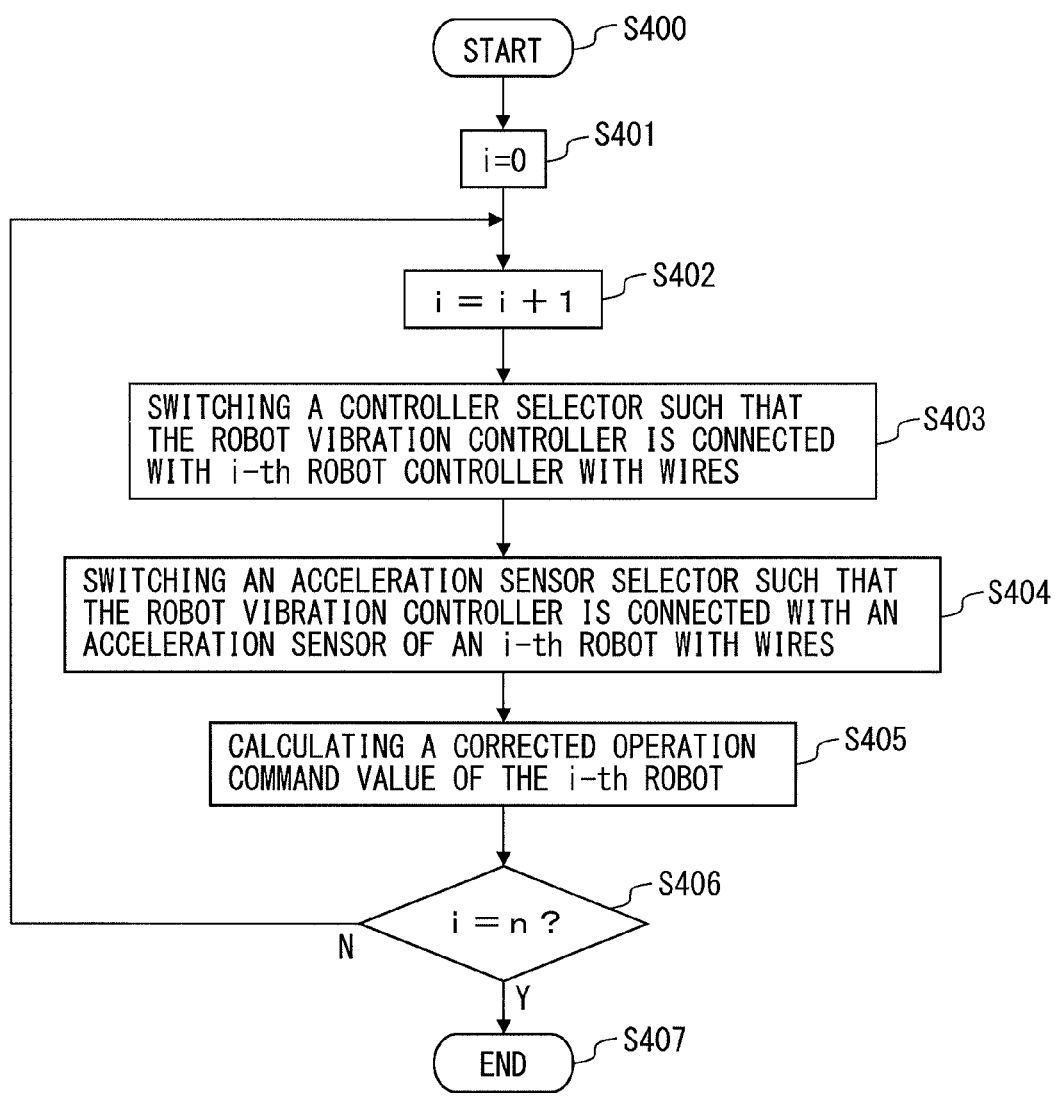
FIG. 13 is a flowchart illustrating a procedure wherein corrected operation command values of a plurality of robots are calculated by using a vibration control robot system according to Example 2 of the present invention.

Next, a procedure wherein vibration control of a plurality of robots is simultaneously performed by using a robot vibration controller according to Example 2 of the present invention will be described. FIG. 13 is a flowchart illustrating a procedure wherein corrected operation command values of a plurality of robots are calculated by using the vibration control robot system according to Example 2 of the present invention.

First, in step S401, an initial value of the number i for specifying a robot is set to 0. Next, in step S402, i is incremented by 1.

Next, in step S403, a controller selector 17 is switched such that the robot vibration controller 21 is connected to the i-th robot controller 201-i with wires. For example, when i=1, communication between the robot vibration controller 21 and the robot controller 201-1 can be performed.

Next, in step S404, the acceleration sensor selector 18 is switched such that the robot vibration controller 21 is connected to an acceleration sensor of the i-th robot with wires. For example, when i=1, communication between the robot vibration controller 21 and the acceleration sensor 20-1 of the robot 10-1 can be performed.

Next, in step S405, a corrected operation command value of the i-th robot is calculated. The procedure for calculating a corrected operation command value is the same as mentioned above.

The corrected operation command value is calculated and vibration control is completed, and then, by judging whether i=n or not in step S406, whether vibration control of all n sets of robots which are targets of vibration control is completed is judged. When i=n, vibration control of all robots is judged to be completed, and the vibration control operation is terminated. On the other hand, when i<n, returning to step S402, i is incremented by 1 to execute vibration control of a robot which is the next target of vibration control.

By adopting such a constitution as above, vibration control of a plurality of robots can be simultaneously performed by using one robot vibration controller.

By adopting the vibration control robot system according to Example 2 of the present invention, since the robot controller and the robot vibration controller are connected with wires, this can provide an advantage, for example, in a case where it is difficult to transmit and receive data wirelessly due to noise or the like.

(Third Embodiment)

Figure 14:
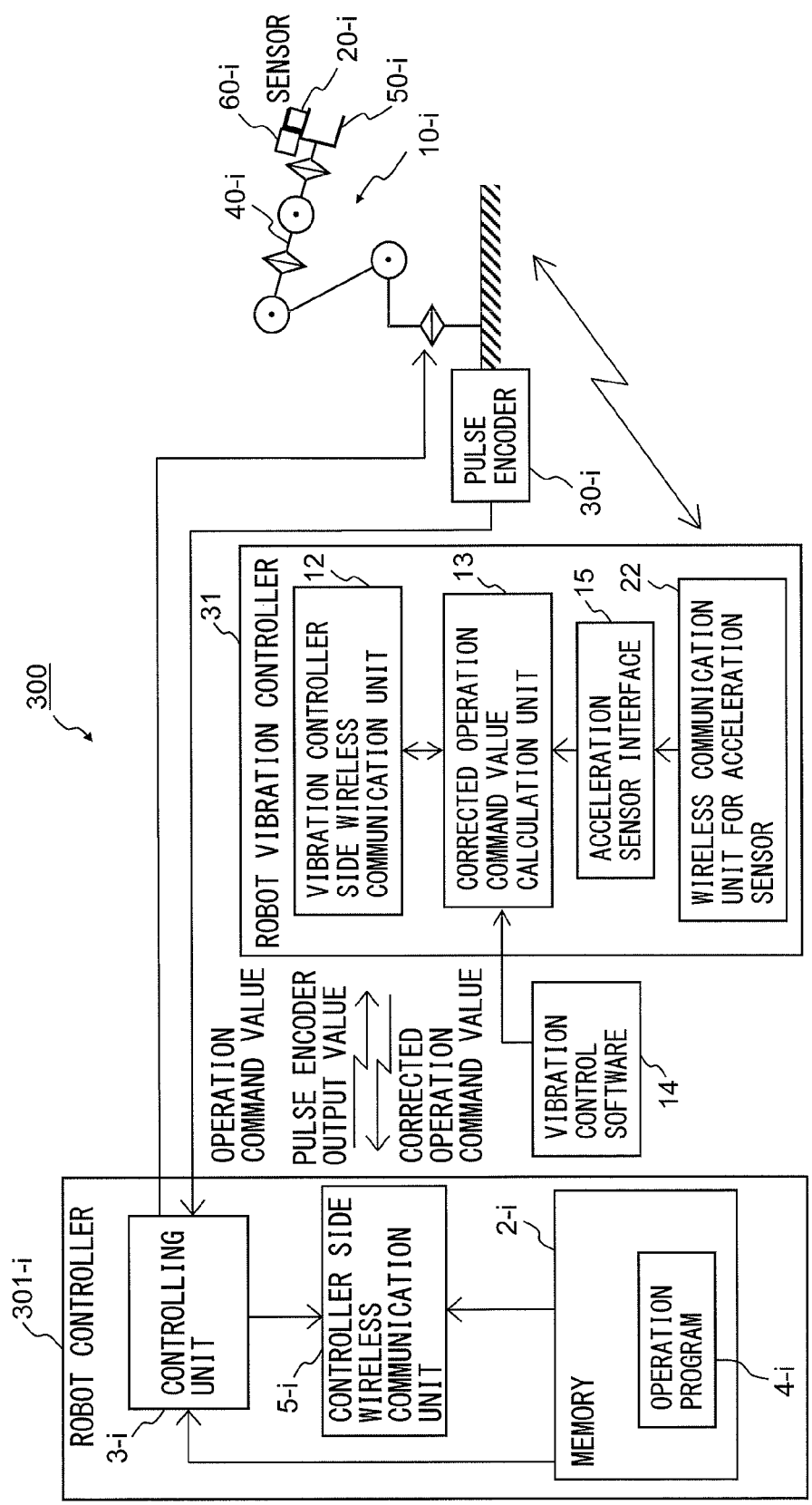
FIG. 14 is a block diagram illustrating the constitution of a vibration control robot system according to Example 3 of the present invention.

Next, a vibration control robot system according to Example 3 of the present invention will be described by way of the Drawings. FIG. 14 is a block diagram of the vibration control robot system according to Example 3 of the present invention. A vibration control robot system 300 according to Example 3 includes a robot controller 301-i which controls a robot 10-i and a robot vibration controller 31, and a robot vibration controller 31 is characterized by being arranged independently of the robot controller 301-i and in that communication between the acceleration sensor 20-i of the robot 10-i and an acceleration sensor interface 15 of a robot vibration controller 31 is performed wirelessly via a wireless communication unit for acceleration sensor 22.

A difference between the vibration control robot system 300 according to Example 3 and the vibration control robot system 100 according to Example 1 is that communication between the acceleration sensor 20-i of the robot 10-i and the acceleration sensor interface 15 of the robot vibration controller 31 is performed wirelessly via the wireless communication unit for acceleration sensor 22. In the acceleration sensor 20-i of the robot 10-i, an acceleration sensor transmitting unit 60-i for transmitting an acceleration data detected by the acceleration sensor 20-i to the wireless communication unit for acceleration sensor 22 of the robot vibration controller 31 is arranged. Since the procedure by which vibration control of the robot 10-i is performed by calculating a corrected operation command value is the same as in Example 1, a detailed description thereof is omitted.

Next, an embodiment wherein vibration control is performed on a plurality of robots by using the robot vibration controller according to Example 3 of the present invention will be described. Since the robot vibration controller of the present invention can be arranged independently of a robot controller, individual vibration control of the plurality of robots can also be performed by using one robot vibration controller, and alternatively, simultaneous vibration control of the plurality of robots can also be performed. These two control methods will now be described.

Figure 15A:
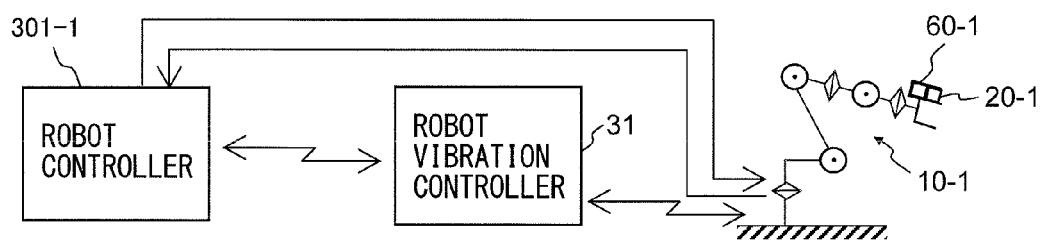
FIGS. 15A-15C are block diagrams illustrating a constitution wherein vibration control of a plurality of robots is individually performed by using a vibration control robot system according to Example 3 of the present invention.
Figure 15B:
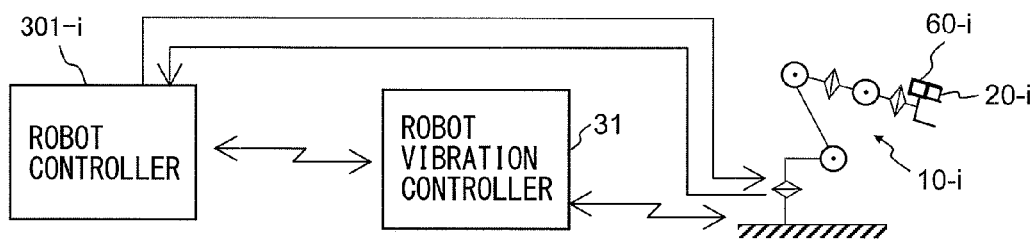
Figure 15C:
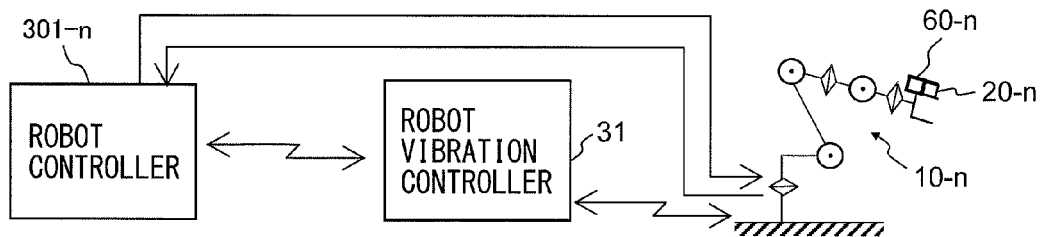

First, a case wherein individual vibration control of a plurality of (n) robots 10-1 to 10-n by using one robot vibration controller will be described. FIGS. 15A-15C are block diagrams illustrating a constitution wherein individual vibration control of a robot is performed by using vibration control robot system according to Example 3 of the present invention. First, as illustrated in FIG. 15A, a robot vibration controller 31 is connected to a first robot controller 301-1 and to a robot 10-1, and vibration control is performed. Here, the robot vibration controller 31 and the robot controller 301-1 are connected wirelessly, and the robot vibration controller 31 and an acceleration sensor 20-1 of the robot 10-1 are also connected wirelessly. The method of vibration control is the same as mentioned above.

Next, as illustrated in FIG. 15B, for performing vibration control of other robots 10-i (i=2 to n−1), the robot vibration controller 31 is connected to a robot controller 301-i wirelessly, and the robot vibration controller 31 is also connected to an acceleration sensor 20-i of a robot 10-i wirelessly, and thereafter, vibration control of the robot 10-i is performed.

Lastly, as illustrated in FIG. 15C, for performing vibration control of the last robot 10-n, the robot vibration controller 31 and the robot controller 301-n are connected wirelessly, and the robot vibration controller 31 and the acceleration sensor 20-n of the robot 10-n are also connected wirelessly, and thereafter, vibration control of the robot 10-n is performed.

By adopting such a constitution as above, vibration control of a plurality of robots can be individually performed by using one robot vibration controller.

Figure 16:
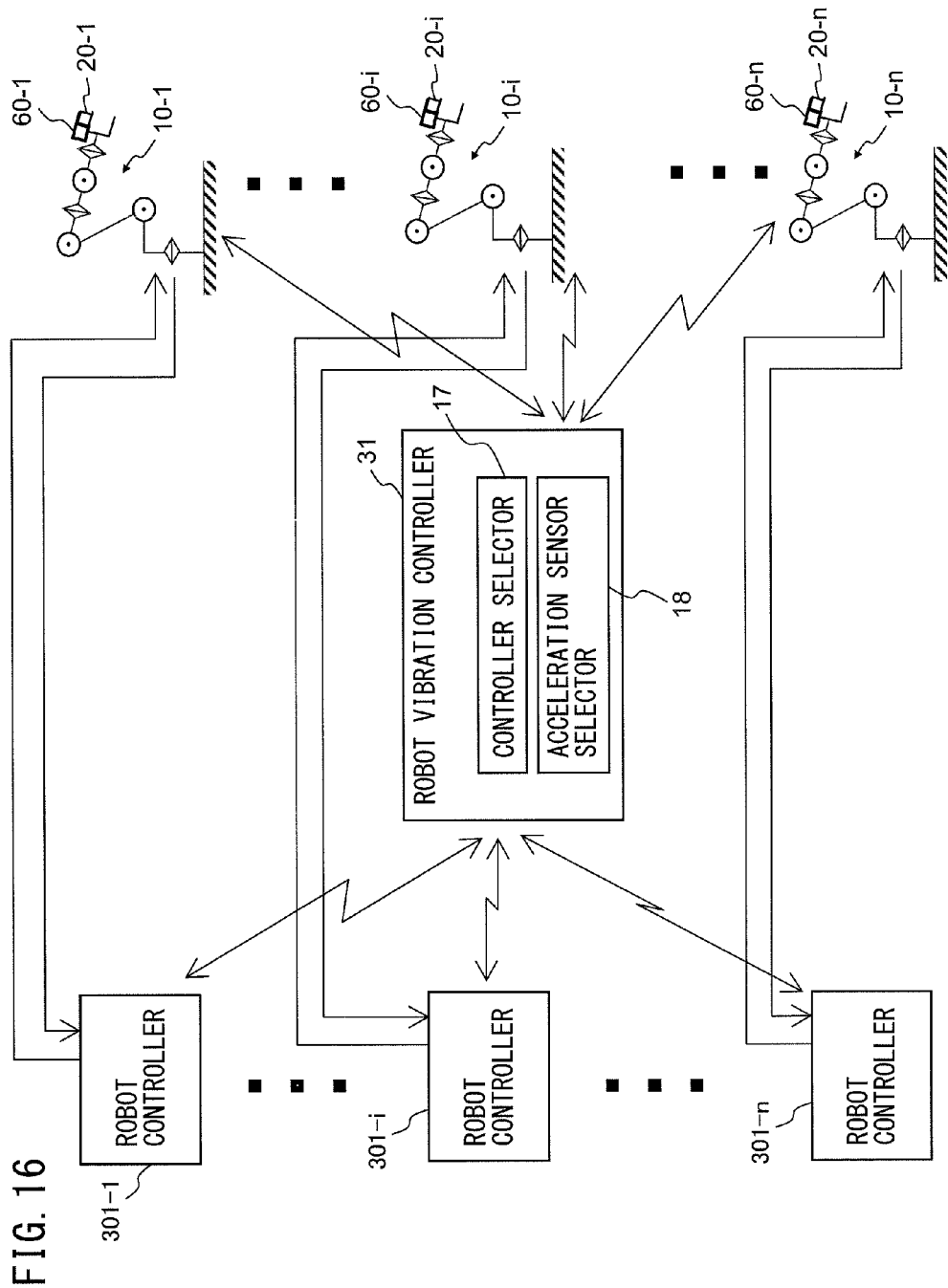
FIG. 16 is a block diagram illustrating a constitution wherein vibration control of a plurality of robots is simultaneously performed by using a vibration control robot system according to Example 3 of the present invention.

Next, a case wherein simultaneous vibration control of a plurality of (n) robots 10-1 to 10-n is performed by using one robot vibration controller will be described. FIG. 16 is a block diagram illustrating a constitution wherein simultaneous vibration control of a robot is performed by using the vibration control robot system according to Example 3 of the present invention.

As illustrated in FIG. 16, a plurality of robot controllers 301-1 to 301-n are connected to the robot vibration controller 31 wirelessly. On the robot vibration controller 31, a controller selector 17 is arranged for communicating with a specific one of robot controllers 301-1 to 301-n. Acceleration sensors 20-1 to 20-n of a plurality of robots 10-1 to 10-n are connected to the robot vibration controller 31 wirelessly. On the robot vibration controller 31, an acceleration sensor selector 18 is arranged for communicating with a specific one of acceleration sensors 20-1 to 20-n.

Figure 17:
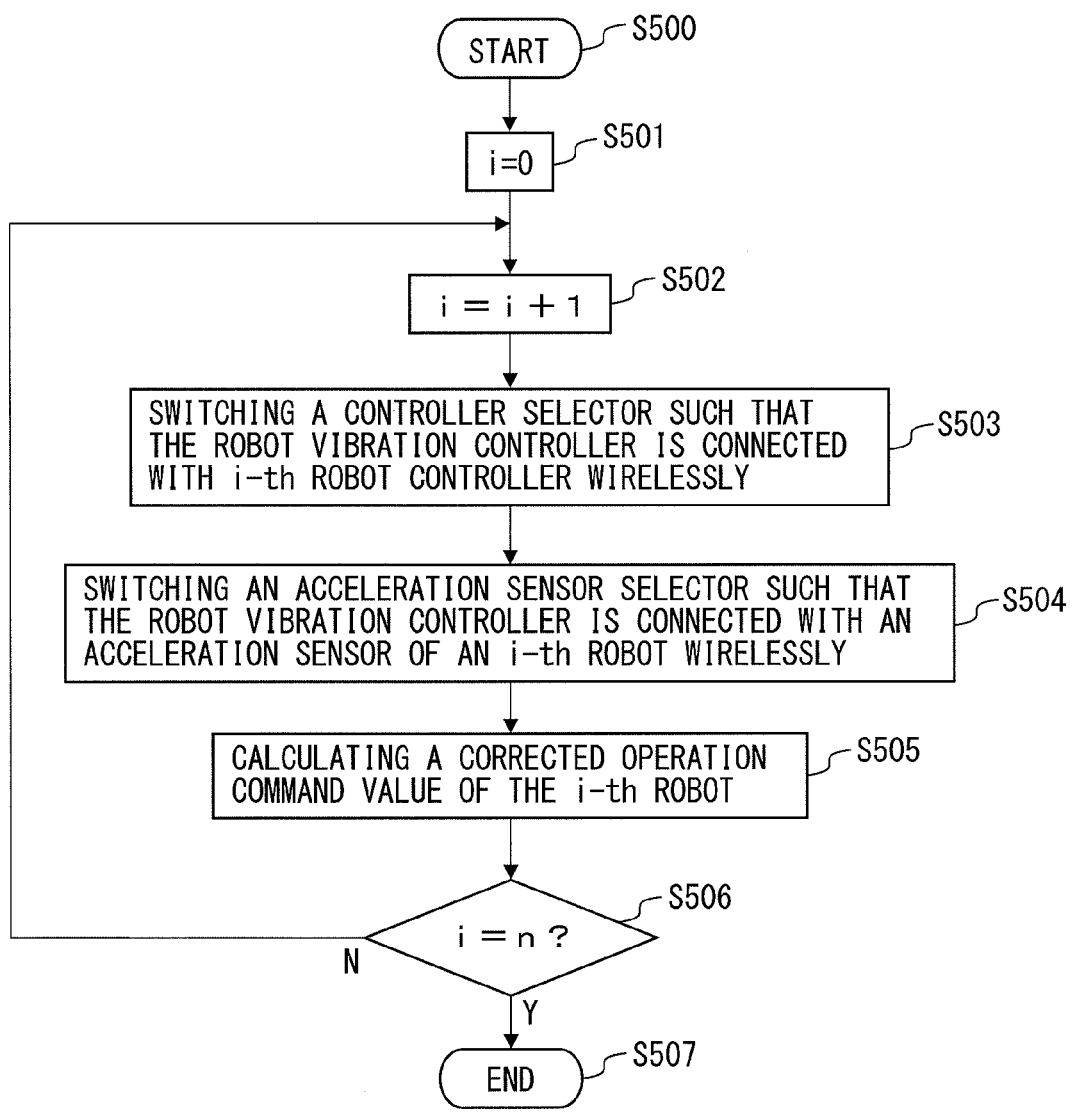
FIG. 17 is a flowchart illustrating a procedure wherein corrected operation command values of a plurality of robots are calculated by using a vibration control robot system according to Example 3 of the present invention.

Next, a procedure wherein vibration control of a plurality of robots is simultaneously performed by using a robot vibration controller according to Example 3 of the present invention will be described. FIG. 17 is a flowchart illustrating a procedure wherein corrected operation command values of a plurality of robots are calculated by using the vibration control robot system according to Example 3 of the present invention.

First, in step S501, an initial value of the number i for specifying a robot is set to 0. Next, in step S502, i is incremented by 1.

Next, in step S503, a controller selector 17 is switched such that the robot vibration controller 31 is connected to the i-th robot controller 301-i wirelessly. For example, when i=1, communication between the robot vibration controller 31 and the robot controller 301-1 can be performed.

Next, in step S504, the acceleration sensor selector 18 is switched such that the robot vibration controller 31 is connected to an acceleration sensor of the i-th robot wirelessly. For example, when i=1, communication between the robot vibration controller 31 and the acceleration sensor 20-1 of the robot 10-1 can be performed.

Next, in step S505, a corrected operation command value of the i-th robot is calculated. The procedure for calculating a corrected operation command value is the same as mentioned above.

The corrected operation command value is calculated and vibration control is completed, and then, by judging whether i=n or not in step S506, whether vibration control of all n sets of robots which are targets of vibration control is completed is judged. When i=n, vibration control of all robots is judged to be completed, and the vibration control operation is terminated. On the other hand, when 1<n, returning to step S502, i is incremented by 1 to execute vibration control of a robot which is the next target of vibration control.

By adopting such a constitution as above, vibration control of a plurality of robots can be simultaneously performed by using one robot vibration controller.

By adopting the vibration control robot system according to Example 3 of the present invention, since communication between the acceleration sensor of the robot and the acceleration sensor interface of the robot vibration controller is performed wirelessly, data can be easily transmitted and received between the robot vibration controller and the acceleration sensor of the robot.

(Fourth Embodiment)

Figure 18:
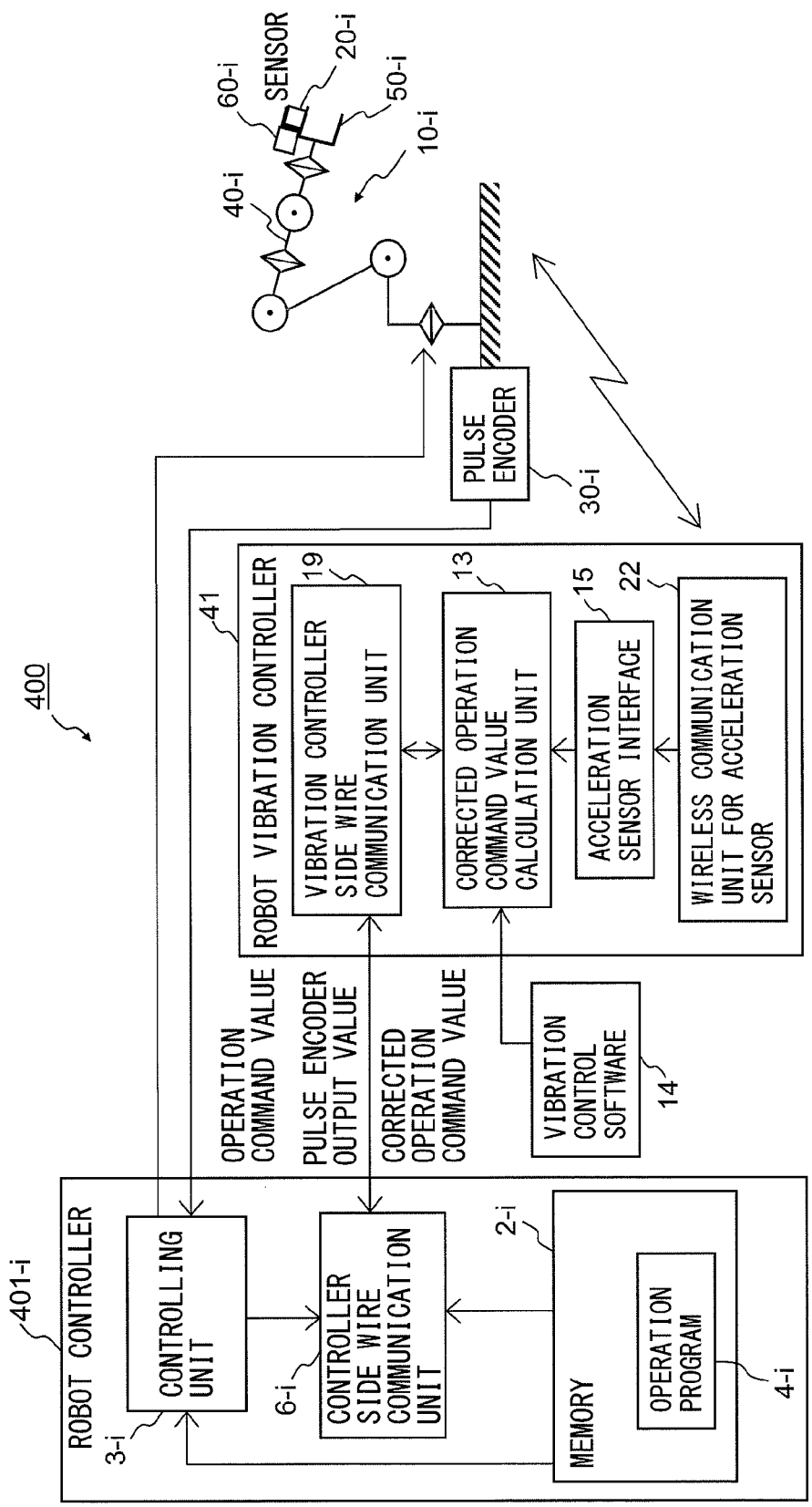
FIG. 18 is a block diagram illustrating the constitution of a vibration control robot system according to Example 4 of the present invention.

Next, a vibration control robot system according to Example 4 of the present invention will be described by way of the Drawings. FIG. 18 is a block diagram of the vibration control robot system according to Example 4 of the present invention. A vibration control robot system 400 according to Example 4 includes a robot controller 401-i which controls a robot 10-i and a robot vibration controller 41, and a robot vibration controller 41 is characterized by being arranged independently of the robot controller 401-i, in that communication between a controller-side wire communication unit 6-i which is a controller-side communication unit of the robot vibration controller 41 and a vibration-controller-side wire communication unit 19 which is a vibration-controller-side communication unit is performed with wires, and in that communication between the acceleration sensor 20-i of the robot 10-i and an acceleration sensor interface 15 of a robot vibration controller 41 is performed wirelessly via a wireless communication unit for acceleration sensor 22.

A difference between the vibration control robot system 400 according to Example 4 and the vibration control robot system 200 according to Example 2 is that communication between the acceleration sensor 20-i of the robot 10-i and the acceleration sensor interface 15 of the robot vibration controller 41 is performed wirelessly via the wireless communication unit for acceleration sensor 22. In the acceleration sensor 20-i of the robot 10-i, an acceleration sensor transmitting unit 60-i for transmitting acceleration data detected by the acceleration sensor 20-i to the wireless communication unit for acceleration sensor 22 of the robot vibration controller 41 is arranged. Since the procedure by which vibration control of the robot 10-i is performed by calculating a corrected operation command value is the same as in Example 1, a detailed description thereof is omitted.

Next, an embodiment wherein vibration control is performed on a plurality of robots by using the robot vibration controller according to Example 4 of the present invention will be described. Since the robot vibration controller of the present invention can be arranged independently of a robot controller, individual vibration control of the plurality of robots can also be performed by using one robot vibration controller, and alternatively, simultaneous vibration control of the plurality of robots can also be performed. These two control methods will now be described.

Figure 19A:
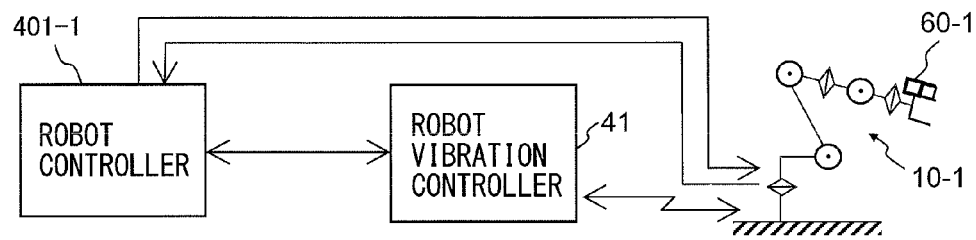
FIGS. 19A-19C are block diagrams illustrating a constitution wherein vibration control of a plurality of robots is individually performed by using a vibration control robot system according to Example 4 of the present invention.
Figure 19B:
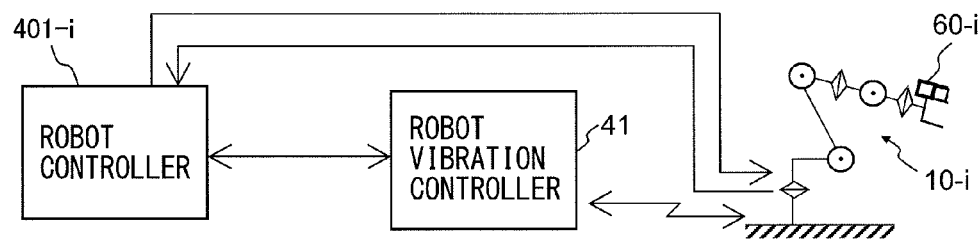
Figure 19C:
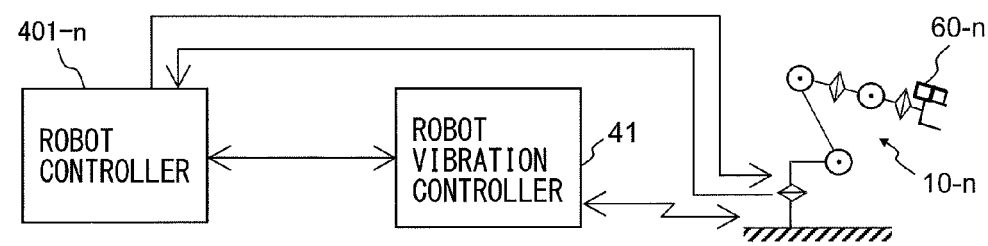

First, a case wherein individual vibration control of a plurality of (n) robots 10-1 to 10-n by using one robot vibration controller will be described. FIGS. 19A-19C are block diagrams illustrating a constitution when individual vibration control of a robot is performed by using vibration control robot system according to Example 4 of the present invention. First, as illustrated in FIG. 19A, a robot vibration controller 41 is connected to a first robot controller 401-1 and to a robot 10-1, and vibration control is performed. Here, the robot vibration controller 41 and the robot controller 401-1 are connected with wires, and the robot vibration controller 41 and an acceleration sensor 20-1 of the robot 10-1 are connected wirelessly. The method of vibration control is the same as mentioned above.

Next, as illustrated in FIG. 19B, for performing vibration control of other robots 10-i (i=2 to n−1), the robot vibration controller 41 is connected to a robot controller 401-i with wires, and the robot vibration controller 41 is connected to an acceleration sensor 20-i of a robot 10-i wirelessly, and thereafter, vibration control of the robot 10-i is performed.

Lastly, as illustrated in FIG. 19C, for performing vibration control of the last robot 10-n, the robot vibration controller 41 and the robot controller 401-n are connected with wires, and the robot vibration controller 41 and the acceleration sensor 20-n of the robot 10-n are connected wirelessly, and thereafter, vibration control of the robot 10-n is performed.

By adopting such a constitution as above, vibration control of a plurality of robots can be individually performed by using one robot vibration controller.

Figure 20:
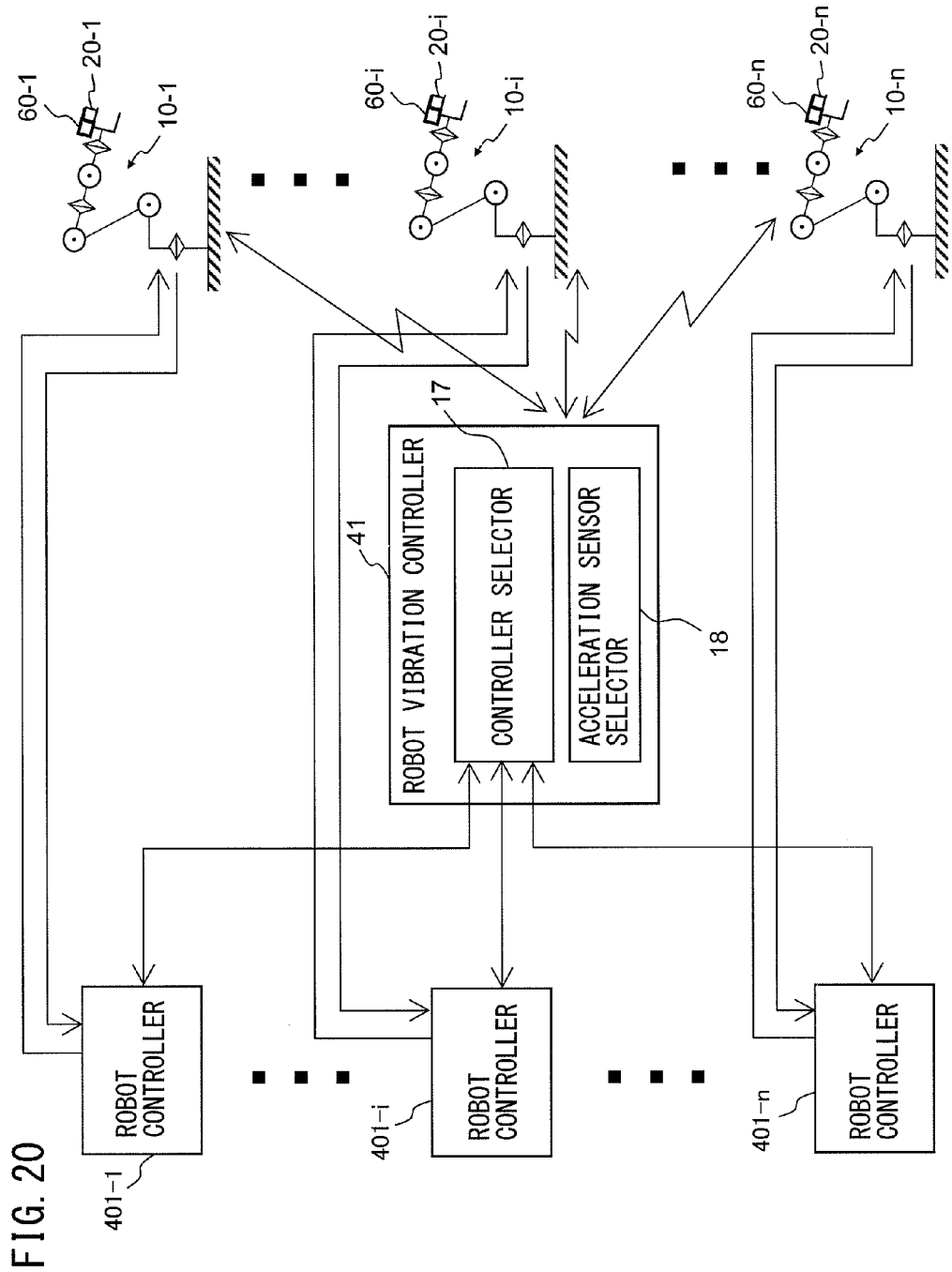
FIG. 20 is a block diagram illustrating a constitution wherein vibration control of a plurality of robots is simultaneously performed by using a vibration control robot system according to Example 4 of the present invention.

Next, a case wherein simultaneous vibration control of a plurality of (n) robots 10-1 to 10-n is performed by using one robot vibration controller will be described. FIG. 20 is a block diagram illustrating a constitution when simultaneous vibration control of a robot is performed by using the vibration control robot system according to Example 4 of the present invention.

As illustrated in FIG. 20, a plurality of robot controllers 401-1 to 401-n are connected to the robot vibration controller 41 with wires. On the robot vibration controller 41, a controller selector 17 is arranged for communicating with a specific one of robot controllers 401-1 to 401-n. Acceleration sensors 20-1 to 20-n of a plurality of robots 10-1 to 10-n are connected to the robot vibration controller 41 wirelessly. On the robot vibration controller 41, an acceleration sensor selector 18 is arranged for communicating with a specific one of acceleration sensors 20-1 to 20-n.

Figure 21:
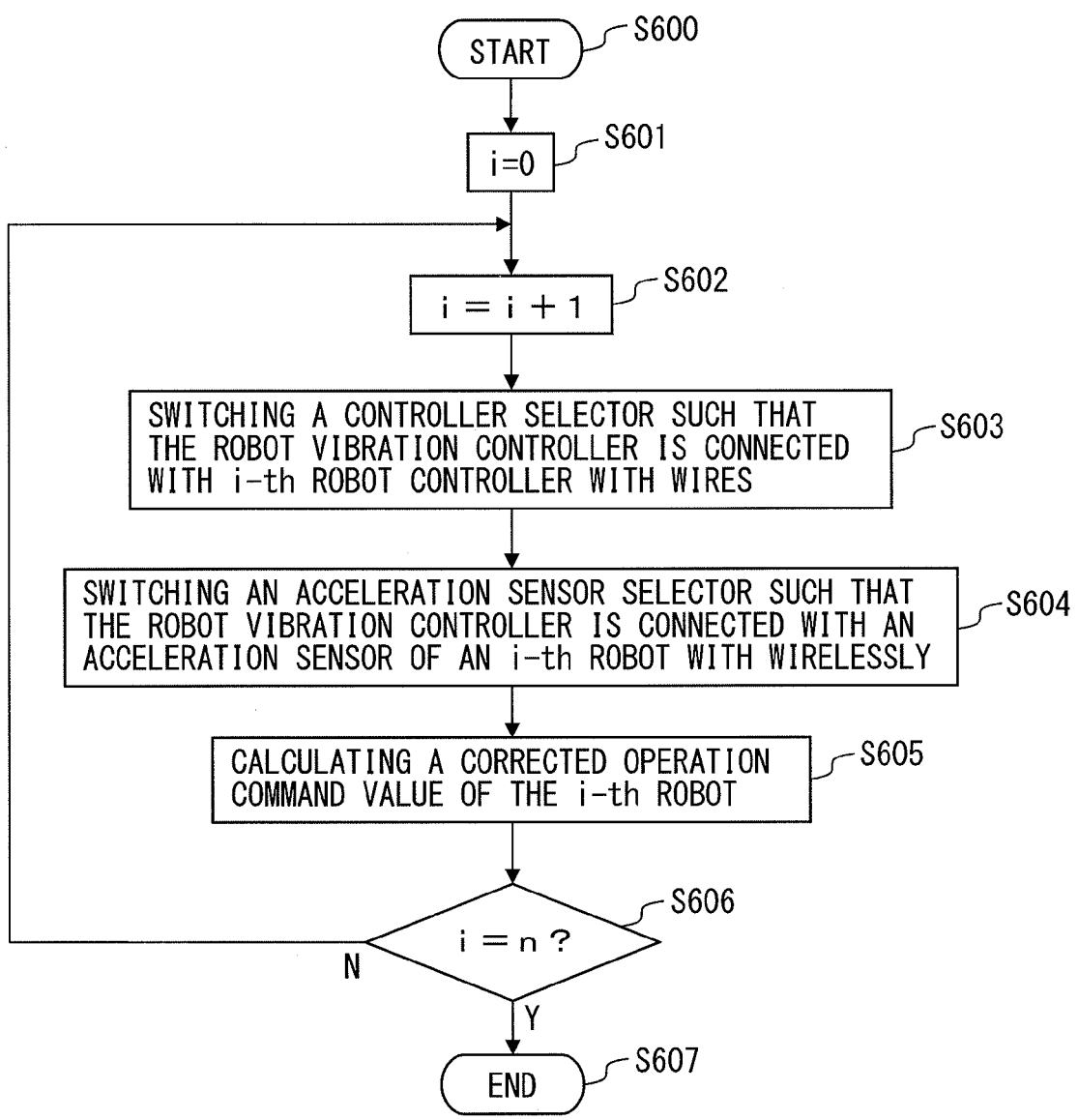
FIG. 21 is a flowchart illustrating a procedure wherein corrected operation command values of a plurality of robots are calculated by using a vibration control robot system according to Example 4 of the present invention.

Next, a procedure wherein vibration control of a plurality of robots is simultaneously performed by using a robot vibration controller according to Example 4 of the present invention will be described. FIG. 21 is a flowchart illustrating a procedure wherein corrected operation command values of a plurality of robots are calculated by using the vibration control robot system according to Example 4 of the present invention.

First, in step S601, an initial value of the number i for specifying a robot is set to 0. Next, in step S602, i is incremented by 1.

Next, in step S603, a controller selector 17 is switched such that the robot vibration controller 41 is connected to the i-th robot controller 401-i with wires. For example, when i=1, communication between the robot vibration controller 41 and the robot controller 401-1 can be performed.

Next, in step S604, the acceleration sensor selector 18 is switched such that the robot vibration controller 41 is connected to an acceleration sensor of the i-th robot wirelessly. For example, when i=1, communication between the robot vibration controller 41 and the acceleration sensor 20-1 of the robot 10-1 can be performed.

Next, in step S605, a corrected operation command value of the i-th robot is calculated. The procedure for calculating a corrected operation command value is the same as mentioned above.

The corrected operation command value is calculated and vibration control is completed, and then, by judging whether i=n or not in step S606, whether vibration control of all n sets of robots which are targets of vibration control is completed is judged. When i=n, vibration control of all robots is judged to be completed, and the vibration control operation is terminated. On the other hand, when 1<n, returning to step S602, i is incremented by 1 to execute vibration control of a robot which is the next target of vibration control.

By adopting such a constitution as above, vibration control of a plurality of robots can be simultaneously performed by using one robot vibration controller.

By adopting the vibration control robot system according to Example 4 of the present invention, since communication between the acceleration sensor of the robot and the acceleration sensor interface of the robot vibration controller is performed wirelessly, data can be easily transmitted and received between the robot vibration controller and the acceleration sensor of the robot.

A robot vibration controller constituting a vibration control robot system of the above described Examples may be movable or portable. By so doing, for a plurality of robots which are present in a separate place, vibration control of the robots can be performed in mobile fashion.

Although, in the above Examples, a constitution is adopted in which acceleration data detected by an acceleration sensor is received by a robot vibration controller, the present invention is not limited thereto, and may have a constitution in which acceleration data detected by an acceleration sensor is received by a robot controller, and the acceleration data received is transmitted from the robot controller to a robot vibration controller.

Although, for the robot controllers and the robot vibration controllers of the present Examples, constitutions having a wireless communication unit or a wire communication unit are illustrated, a constitution may be adopted which includes both a wireless communication unit and a wire communication unit and in which these units are switched, depending on a connection embodiment. For example, one robot controller and the robot vibration controller may transmit and receive data wirelessly, and another robot controller and the robot vibration controller may transmit and receive data with wires. In this manner, when a robot vibration controller can deal with both wireless and wired data transmission and reception, data can be transmitted and received by using one robot vibration controller, no matter which of a wireless method and a wired method a communication unit of the robot controller adopts.

What is claimed is:

1. A vibration control robot system comprising:
a robot controller transmitting an operation command value to a servo motor which drives a robot and receiving an output value of a pulse encoder of the servo motor moving based on the operation command value, wherein the robot controller includes a controller-side communication unit which transmits the operation command value and the output value of the pulse encoder to a robot vibration controller; and
the robot vibration controller including: an acceleration sensor interface which receives data of an acceleration sensor included in a control target portion of the robot; a corrected operation command value calculation unit which calculates, based on the output value of the pulse encoder and the data of the acceleration sensor, a corrected operation command value obtained by correcting the operation command value so as to suppress vibration of the robot; and a vibration-controller-side communication unit which transmits the corrected operation command value to the robot controller,
wherein the robot vibration controller is arranged independently of the robot controller, and
wherein simultaneous vibration control of a plurality of robots controlled by a plurality of robot controllers is performed by using the one robot vibration controller.

2. The vibration control robot system according to claim 1, wherein communication between the controller-side communication unit and the vibration-controller-side communication unit is performed wirelessly.

3. The vibration control robot system according to claim 1, wherein communication between the controller-side communication unit and the vibration-controller-side communication unit is performed with wires.

4. The vibration control robot system according to claim 1, wherein communication between the acceleration sensor of the robot and the acceleration sensor interface is performed wirelessly.

5. The vibration control robot system according to claim 1, wherein communication between the acceleration sensor of the robot and the acceleration sensor interface is performed with wires.

6. The vibration control robot system according to claim 1, wherein simultaneous vibration control of a plurality of robots controlled by a plurality of robot controllers is performed by using the one robot vibration controller.

* * * * *